(12) United States Patent
Chiba et al.

(10) Patent No.: US 7,089,654 B2
(45) Date of Patent: Aug. 15, 2006

(54) BALL GIVEN QUANTITY SUPPLY APPARATUS AND METHOD AND APPARATUS FOR ASSEMBLING BALL SCREW APPARATUS

(75) Inventors: Kazuyasu Chiba, Kanagawa (JP); Hiroshi Araki, Kanagawa (JP)

(73) Assignee: NSK Ltd., Tokyo (JP)

( * ) Notice: Subject to any disclaimer, the term of this patent is extended or adjusted under 35 U.S.C. 154(b) by 358 days.

(21) Appl. No.: 10/665,182

(22) Filed: Sep. 22, 2003

(65) Prior Publication Data

US 2004/0103517 A1    Jun. 3, 2004

(30) Foreign Application Priority Data

Sep. 26, 2002 (JP) .......................... P. 2002-280250
Apr. 24, 2003 (JP) .......................... P. 2003-120154

(51) Int. Cl.
*B23P 19/00* (2006.01)

(52) U.S. Cl. .......................... 29/724; 29/809; 221/254; 221/236; 221/298

(58) Field of Classification Search .................. 29/724, 29/809; 221/254, 236, 298
See application file for complete search history.

(56) References Cited

U.S. PATENT DOCUMENTS

| | | | | | |
|---|---|---|---|---|---|
| 488,084 | A | * | 12/1892 | Miner | ........................ 221/238 |
| 899,979 | A | * | 9/1908 | Hill | ............................ 194/294 |
| 2,824,665 | A | * | 2/1958 | Lamouria | .................... 221/179 |
| 3,533,151 | A | * | 10/1970 | Gaudry | ........................ 29/724 |
| 3,602,403 | A | * | 8/1971 | Klem | ........................ 222/251 |
| 3,703,232 | A | * | 11/1972 | Zbiegien | ..................... 198/383 |

FOREIGN PATENT DOCUMENTS

| | | |
|---|---|---|
| JP | 62-22737 B2 | 5/1987 |
| JP | 1-24025 Y2 | 7/1989 |
| JP | 6-50108 Y2 | 12/1994 |
| JP | 2530401 B2 | 6/1996 |
| JP | 2991412 B2 | 10/1999 |

* cited by examiner

*Primary Examiner*—George Nguyen
*Assistant Examiner*—Christopher M. Koehler
(74) *Attorney, Agent, or Firm*—Sughrue Mion, PLLC

(57) ABSTRACT

There are provided with a ball given quantity supply apparatus for supplying a given quantity of balls to an apparatus using a given quantity of balls such as a bearing, a ball screw and a linear guide, and a method and apparatus for assembling a ball screw apparatus for use in a feed mechanism employed in various machines.

14 Claims, 11 Drawing Sheets

A-A

B-B

BALL GIVEN QUANTITY SUPPLY APPARATUS AND METHOD AND APPARATUS FOR ASSEMBLING BALL SCREW APPARATUS

BACKGROUND OF THE INVENTION

The present invention relates to a ball given quantity supply apparatus for supplying a given quantity of balls to an apparatus using a given quantity of balls such as a bearing, a ball screw and a linear guide.

Further, the present invention relates to method and apparatus for assembling a ball screw apparatus for use in a feed mechanism employed in various machines.

A ball given quantity supply apparatus of this type is widely known because it is disclosed, for example, in the Examined Japanese Utility Model Application Publication No. Hei1-24025 and the Japanese Patent No. 2991412.

A ball given number take-out apparatus (ball given number supply apparatus) disclosed in the Examined Japanese Utility Model Application Publication No. Hei1-24025 comprises: a hopper 1 in which a plurality of balls W can be stored; a cylindrical-shaped fixed guide 2 fixed to the lower surface of the hopper 1 and extended downwardly therefrom; a collecting tube 4 supported in an internal hole formed in the fixed guide 2 in such a manner that it can be slided in a given range in the upward and downward directions, the collecting tube 4 including a ball passage 3 formed so as to penetrate therethrough in the upward and downward directions; a inducing tube 5 fixed to the upper end portion of the ball passage 3, penetrating through the bottom wall of the hopper 1 so as to be slidable in the upward and downward directions, and projected to the downwardly inclined inner bottom surface of the hopper 1; and, shutter members 6, 7 respectively disposed in the two upper and lower portions of the collecting tube 4, while each of them is able to project and retreat between a projecting position in which it projects into the ball passage 3 to thereby close the ball passage 3 and a retreating position in which it retreats from the ball passage 3 to thereby open the ball passage 3. The shutter members 6, 7 are respectively energized toward their associated retreating positions by their associated spring members 10; however, due to the action of a camportion 8 disposed on the inner peripheral surface of the fixed guide 2, while the collecting tube 4 is being positioned at the lower end position of the above-mentioned given range in the internal hole of the fixed guide 2, the upper shutter member 6 is disposed at the retreating position and the lower shutter member 7 is disposed at the projecting position. Also, while the collecting tube 4 is being positioned at the upper end position of the above-mentioned given range in the internal hole of the fixed guide 2, the upper shutter member 6 is disposed at the projecting position and the lower shutter member 7 is disposed at the retreating position.

While the collecting tube 4 is being disposed at the above lower end position, the lower end portion of the collecting pipe 4 is projected downwardly from the lower end of the internal hole of the fixed guide 2 and the plurality of balls W moved from the inner bottom surface of the hopper 1 into the inducing pipe 5 reach the lower shutter member 7 disposed at the projecting position in the ball passage 3.

And, in case where the lower end portion of the collecting tube 4 at the above-mentioned upper lower end position is pushed upwardly to thereby move the collecting tube 4 up to the above-mentioned upper end position, due to the action of the cam portion 8 of the inner peripheral surface of the fixed guide 2, the lower shutter member 7 is moved to the retreating position and the upper shutter member 6 is moved to the projecting position, so that a given number of balls W in the range of the ball passage 3 between the lower shutter member 7 and upper shutter member 6 are discharged from the end wall of the ball passage 3.

Further, in case where the push-up operation of the lower end portion of the collecting tube 4 at the above upper end position is stopped to thereby move the collecting tube 4 to the above lower end position, due to the action of the camportion 8 of the inner peripheral surface of the fixed guide 2, the lower shutter member 7 is moved to the projecting position and also the upper shutter member 6 is moved to the retreating position, so that a plurality of balls W moved into the inducing tube 5 are allowed to reach again the lower shutter member 7 at the projecting position in the ball passage 3 of the collecting tube 4.

Now, a ball given quantity supply apparatus disclosed in the Japanese Patent No. 2991412 comprises: a ball storage case 21 in which a plurality of balls 23 are stored; an air blow-in portion 22 for blowing the air into the ball storage case 21; a ball supply tube 24 to which the balls 23 are supplied from within the ball storage case 21 by the air blown from the air blow-in portion 22 into the ball storage case 21; and, a rotation block 7 which is disposed on the leading end of the ball supply tube 24 and also which includes a ball storage portion 7a formed so as to penetrate through the rotation block 7 for storing a given number of balls 23 therein. The rotation block 7 is held by and between an upper plate 5 and a lower plate 6. In the upper plate 5, the leading end of the ball supply tube 24 is fixed to a given position on the rotation locus of the upper end of the ball storage portion 7a of the rotation block 7. Also, in the lower plate 6, there is formed a ball discharge hole 6a at a given position on the rotation locus of the lower end of the ball storage portion 7a of the rotation block 7. By the way, the leading end of the ball supply tube 24 at the above given position of the upper plate 5 and the ball discharge hole 6a at the above given position of the lower plate 6 are disposed with the ball storage portion 7a of the rotation block 7 between them, but they are not on a straight line in the vertical direction.

And, while the upper end of the ball storage portion 7a of the rotation block 7 and the leading end of the ball supply tube 24 of the upper plate 5 are disposed on a straight line in the vertical direction, a plurality of balls 23 are supplied from the ball supply tube 24 into the ball storage portion 7a. Next, while the rotation block 7 is rotated so that the upper end of the ball storage portion 7a of the rotation block 7 is shut off from the leading end of the ball supply tube 24 of the upper plate 5 and further the lower end of the ball storage portion 7a and the ball discharge hole 6a of the lower plate 6 are disposed on a straight line in the vertical direction, a given number of balls 23 stored within the ball storage portion 7a are discharged from the ball discharge hole 6a.

[Patent Literature 1]

The Examined Japanese Utility Model Application Publication No. Hei1-24025 (FIGS. 1 to 3)

[Patent Literature 2]

The Japanese Patent No. 2991412 (FIGS. 2 and 3) In the ball given number take-out apparatus (ball given quantity supply apparatus) disclosed in the Examined Japanese Patent Utility Model No. Hei1-24025 and structured and operated in the above-mentioned manner, each time there arises the need to discharge a given quantity of balls W, the collecting tube 4 must be slided by a given distance in the vertical direction within the internal hole of the fixed guide 2; however, this sliding motion of the collecting tube 4 makes it difficult for the given quantity of balls W to be discharged quickly.

Also, in the above ball given quantity take-out apparatus (ball given quantity supply apparatus), each time the collecting tube 4 is slided by a given distance in the vertical direction within the internal hole of the fixed guide 2, the upper end portion of the inducing tube 5 is slided in the vertical direction with respect to the bottom wall of the hopper 1 to thereby allow a plurality of balls W stored in the hopper 1 to flow into the inducing tube 5. However, in this case, there is a possibility that the plurality of balls W in the hopper 1 can concentrate toward the opening of the upper end of the inducing tube 5 and thus can be clogged there. And, such clogging makes it difficult for a given quantity of balls W to be discharged positively. Further, a ball to be supplied to a bearing, a ball screw and a linear guide, in many cases, is covered with oil which has a relatively high coefficient of viscosity, for example, anticorrosive oil; and, in case where such ball is used in the above ball given number take-out apparatus (ball given quantity supply apparatus), the above-mentioned clogging phenomenon is easier to occur.

Further, since the above ball given number take-out apparatus (ball given quantity supply apparatus) does not include device for detecting that a given number of balls are held in the range between the upper and lower shutter members 6 and 7 in the ball passage 3 of the collecting tube 4 while the collecting tube 4 is disposed at the above lower end position, there is a possibility that, although the above-mentioned clogging phenomenon occurs and thus a given number of balls W are not held in the above range, the collecting tube 4 can be slided from the above lower end position to the above upper end position and thus a given number of balls W cannot be discharged from the lower end of the ball passage 3.

In the ball given quantity supply apparatus disclosed in the Japanese Patent No. 2991412, which is structured in the above-mentioned manner and can operate in the above-mentioned manner, supply of the balls 23 from the ball storage case 21 to the ball supply tube 24 by the air blown from the air blow-in portion 22 into the ball storage case 21 becomes unstable in case where the number of balls 23 stored in the ball storage case 21 is small. Also, in case where balls often covered with oil having a relatively high coefficient of viscosity so as to be supplied to a bearing, a ball screw and a linear guide are stored in the ball storage case 21, the above-mentioned supply of the balls from the ball storage case 21 into the ball supply tube 24 by the air blown into the ball storage case 21 from the air blow-in portion 22 can be unstable.

Therefore, in case where the number of balls 23 stored in the ball storage case 21 is small, or in case where balls covered with oil having a relatively high coefficient of viscosity, for example, anticorrosive oil, are stored in the ball storage case 21 in a large number, there is a possibility that the number of balls 23 stored in the ball supply tube 24 can be smaller than the given number of the balls 23 that can be stored into the ball storage portion 7a of the rotation block 7. Due to this, there is a fear that the number of the balls 23 to be discharged through the ball discharge hole 6a of the lower plate 6 from the ball storage portion 7a of the rotation block 7 can be smaller than the above given number.

Further, a ball screw apparatus comprises: a screw shaft and a nut loosely fitted with the screw shaft; the screw shaft includes a spiral-shaped screw groove formed in the outer peripheral surface thereof and extends in the axial direction thereof, and the nut includes a spiral-shaped screw groove corresponding to the spiral-shaped screw groove of the screw shaft; and, the screw groove of the nut and the screw groove of the screw shaft are disposed opposed to each other to thereby form a load passage between the two grooves. A large number of balls serving as rolling bodies are rollably held in the load passage and, to the nut, there is assembled a circulating part such as a circulating tube which allows the balls rolling along the load passage to circulate endlessly. And, in case where the screw shaft (or the nut) is rotated, the nut (or the screw shaft) can be moved in the axial direction through the rolling movements of the balls.

By the way, as a method for assembling the ball screw apparatus of the above type, for example, there is known a method (for example, see patent literature 3 and patent literature 4), in which, with a nut loosely fitted with a screw shaft having a horizontally disposed axial line, a given number of balls inserted into the nut from a ball insertion hole formed in the nut to thereby introduce the balls into a load passage formed between the nut and screw shaft, and, next, the ball insertion hole is closed by a circulating part such as a circulating tube holding the given number of balls therein.

However, in the above method, since the circulating part holding the given number of balls is used to close the ball insertion hole, there is a fear that the balls can fly out from the circulating part and thus the given number of balls cannot be inserted into the nut, that is, there is found a problem in the respect of the operation efficiency.

Thus, as a method which can solve the above problem, for example, there is proposed the following method for assembling a ball screw apparatus (for example, see patent literature 5).

That is, according to the assembling method disclosed in the patent literature 5, a nut, to which a circulating part is previously assembled, is loosely fitted with a provisional shaft having a vertically disposed axial line; after the phase of the ball exit of a ball introduction passage opened up in the interior of the provisional shaft is matched to the highest position of the screw groove of the nut, a given number of balls are passed into the ball introduction passage at the same time to thereby introduce the balls into between the screw groove of the nut and provisional shaft; next, the balls which could not be introduced into between the screw groove and provisional shaft and are left within the ball introduction passage, are pushed into between the screw groove and provisional shaft using a ball push-in rod; and, after completion of the ball insertion operation, the provisional shaft and screw shaft are engaged with each other, and the nut and screw shaft are fitted with each other at the same time when the provisional shaft is removed from the screw shaft.

[Patent Literature 3]

The Examined Japanese Patent Application Publication No. Sho62-22737

[Patent Literature 4]

The Examined Japanese Utility Model Application Publication No. Hei6-50108

[Patent Literature 5]

The Japanese Patent No. 2530401

However, in the ball screw apparatus assembling method disclosed in the patent literature 5, since the balls, which could not be introduced into between the screw groove of the nut and provisional shaft are left in the ball introduction passage, are pushed into between them using the ball push-in rod, there is a fear that the smaller the lead of the screw groove of the nut is, the more easily the balls can be clogged, which makes it difficult to introduce the balls into the nut smoothly.

SUMMARY OF THE INVENTION

The present invention aims at eliminating the above drawbacks found in the above-cited conventional ball given quantity supply apparatus. Accordingly, it is an object of the invention to provide a ball given quantity supply apparatus which, even in case where balls often covered with oil having a relatively high coefficient of viscosity such as anticorrosive oil for supply to a bearing, a ball screw and a linear guide are supplied in a given quantity, is always able to supply a given quantity of balls positively and quickly.

In attaining the above object, according to the invention, there is provided a ball given quantity supply apparatus, comprising: a ball storage portion for storing a plurality of balls therein; ball arranging device for arranging a plurality of balls stored in the ball storage portion in a line; ball delivery device including a ball passage extended from the ball storage portion so as not only to be able to receive a plurality of balls arranged in a line by the ball arranging device but also to allow the plurality of balls in a line supplied thereto to pass therethrough, the ball delivery device being capable of delivering the plurality of balls arranged in a line in the ball passage from the ball storage portion to the extended end portion of the ball passage using gravity; first gate device disposed at a position near to the ball storage portion in the ball passage of the ball delivery device for opening and closing the ball passage; second gate device disposed at position more distant from the ball storage portion in the ball passage of the ball delivery device than the first gate device for opening and closing the ball passage and also for holding a given quantity of balls between the first gate device and itself; pressurized fluid jetting device disposed in the vicinity of the first gate device in the ball passage of the ball delivery device for jetting out a pressurized fluid onto the balls to thereby separate substances attached to the surfaces of the balls from these surfaces; and, operation control device for detecting that a given quantity of balls are held between the first and second gate device in the ball passage of the ball delivery device, and also for controlling the operations of the first and second gate device.

And, the operation control device opens the first gate device and closes the second gate device while the plurality of balls arranged in a line by the ball arranging device are being supplied into the ball passage of the ball delivery device, and also closes the first gate device and opens the second gate device after it detects that a given quantity of balls are held between the first and second gate device in the ball passage of the ball delivery device.

Now, description will be given below in detail of an embodiment of a ball given quantity supply apparatus according to the invention with reference to the accompanying drawings.

Further, the present invention aims at eliminating the above drawback found in the above-cited conventional ball screw apparatus assembling method. Accordingly, it is an object of the invention to provide method and apparatus for assembling a ball screw apparatus which can assemble a given number of balls into a nut smoothly.

In attaining the above object, according to the invention as set forth Aspect 15, there is provided a method for assembling a ball screw apparatus, comprising the steps of: loosely fitting a nut with a circulating part previously assembled thereto with a provisional shaft including a tapered step portion formed between a small-diameter shaft portion and a large-diameter shaft portion thereof; in this state, fitting a ball insertion jig into between the provisional shaft and the nut from the small-diameter shaft portion and rotating the provisional shaft to thereby introduce a given number of balls inserted from the ball passage of the ball insertion jig into between the screw groove of the nut and the provisional shaft through a guide portion formed between the ball insertion jig and the tapered step portion; then, moving the provisional shaft to the small-diameter shaft portion side with respect to the nut and the ball insertion jig to allow the balls existing in the guide portion to climb over the tapered step portion, thereby introducing the balls into between the screw groove of the nut and the provisional shaft; and then, fitting the screw shaft of the ball screw apparatus with the nut.

According to a method for assembling a ball screw apparatus as set forth in Aspect 16, in a method for assembling a ball screw apparatus as set forth in Aspect 15, when introducing the balls into between the screw groove of the nut and the provisional shaft, the nut is made eccentric to the provisional shaft.

And, according to the invention as set forth in Aspect 17, there is provided an apparatus for assembling a ball screw apparatus, comprising: a provisional shaft which includes a tapered step portion formed between a small-diameter shaft portion and a large-diameter shaft portion thereof and also with which a nut of the ball screw apparatus with a circulating part previously assembled thereto can be loosely fitted; drive device for rotating the provisional shaft; a ball insertion jig fittable into between the provisional shaft and the nut from the small-diameter shaft portion, including a ball passage for receiving a given number of balls, defining a guide portion between the tapered step portion and itself, and capable of introducing the balls inserted into the ball passage into between the provisional shaft and a screw groove formed in the nut and; moving device for moving the provisional shaft to the small-diameter shaft portion side with respect to the nut and the ball insertion jig.

According to the invention as set forth in Aspect 18, in an apparatus for assembling a ball screw apparatus as set forth in Aspect 17, the ball insertion jig includes a ball stopper disposed on the ball exit side of the ball passage so as to separate the ball exit portion or ball entrance portion of the circulating part from the guide portion in order to be able to prevent the balls introduced into between the screw groove of the nut and the provisional shaft from interfering with the balls inserted from the ball passage; and, on the leading end portion of the ball stopper, there is disposed a projection for preventing the balls inserted from the ball passage from touching directly the groove shoulder of the screw groove of the nut.

According the invention as set forth in Aspect 19, in an apparatus for assembling a ball screw apparatus as set forth in Aspect 17 or 18, an elastic member is applied to, buried in, shrinkage fitted with, or bonded to the outer peripheral surface of the provisional shaft including the tapered step portion.

DETAILED DESCRIPTION OF THE PREFERRED EMBODIMENTS

Figure 1:
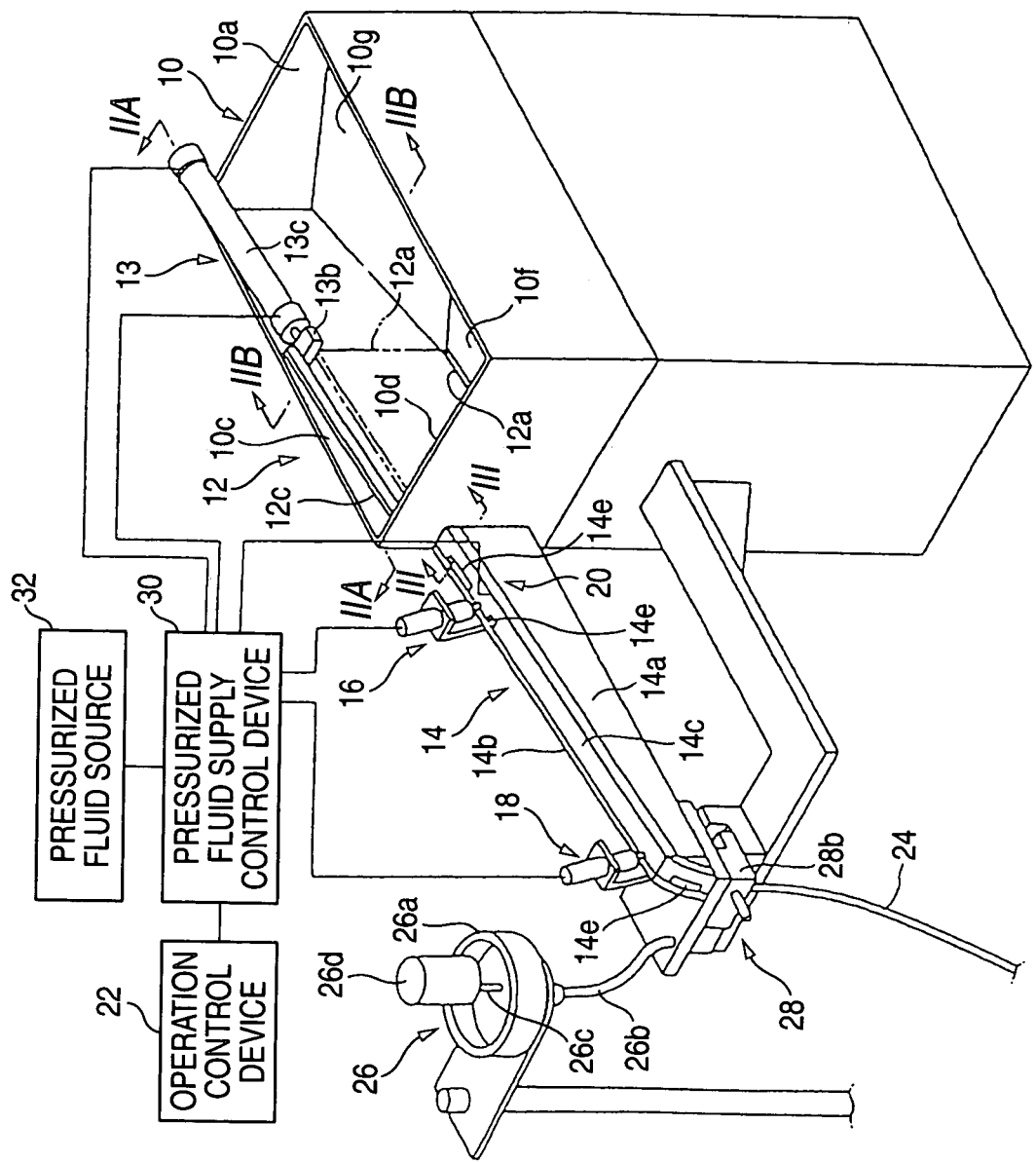
FIG. 1 is a schematically perspective view of the whole of a ball given quantity supply apparatus according to an embodiment of the invention.

Firstly, description will be given below schematically of the whole structure of an embodiment of a ball given quantity supply apparatus according to the invention with reference to FIG. 1. By the way, FIG. 1 is a schematically perspective view of the whole of the above embodiment.

A ball given quantity supply apparatus according to the present embodiment supplies a given quantity of balls to an apparatus which uses a given quantity of balls, for example, a bearing, a ball screw and a linear guide. And, according to the present ball given quantity supply apparatus, even in case where the above balls are covered with oil having a relatively high coefficient of viscosity such as anticorrosive oil, positive and quick supply of the above-mentioned given quantity of balls is always possible.

The present ball given quantity supply apparatus comprises a ball storage portion 10 for storing a plurality of balls therein. In the ball storage portion 10, there is disposed ball arranging device 12 for arranging the plurality of balls stored in the ball storage portion 10 in a line.

A ball delivery device 14 is extended from the ball storage portion 10. The ball delivery device 14 includes a ball passage to which the plurality of balls arranged in a line by the ball arranging device 12 are supplied and also through which the plurality of balls are allowed to pass in a line. The plurality of balls in a line in the ball passage are delivered from the ball storage portion 10 toward the extended end portion thereof due to gravity.

At the position of the ball passage of the ball delivery device 14 that is situated near to the ball storage portion 10, there is disposed first gate device 16 which is used to open and close the ball passage. And, at the position of the ball passage of the ball delivery device that is situated more distant from the ball storage portion 10 than the first gate device 16, there is disposed second gate device 18. The second gate device 18 opens and closes the ball passage to thereby hold a given quantity of balls between the first gate device 16 and itself. In the present embodiment, the first gate device 16 and second gate device 18 can be respectively driven using a pressurized fluid.

In the portion of the ball passage of the ball delivery device 14 that is present in the vicinity of the first gate device 16, there is disposed pressurized fluid jetting device 20. The pressurized fluid jetting device 20 jets out a pressurized fluid onto balls passing through the ball passage to thereby separate substances attached to the surfaces of the balls from these surfaces.

The operations of the first and second gate device 16 and 18 can be controlled by operation control device 22. The operation control device 22 is able to detect that a given quantity of balls are held between the first and second gate device 16 and 18 in the ball passage of the ball delivery device 14.

And, the operation control device 22, while a plurality of balls arranged in a line by the ball arranging device 12 are being supplied into the ball passage of the ball delivery device 14, opens the first gate device 16 and closes the second gate device 18; and, after it detects that a given quantity of balls are held between the first and second gate device 16 and 18 in the ball passage of the ball delivery device 14, it closes the first gate device 16 and, at the same time when the first gate device 16 is closed, or after passage of a given period of time set by a timer (not shown) after the first gate 16 is closed, it opens the second gate 18.

The extended end of the ball passage of the ball delivery device 14 is connected through a ball supply tube 24 to a ball insert apparatus (not shown) which receives a given quantity of balls from the above ball given quantity supply apparatus and inserts a given quantity of balls into an apparatus using a given quantity of balls such as a bearing, a ball screw and a linear guide.

To the portion of the ball passage of the ball delivery device 14 that is present downstream of the second gate device 18, there is connected hand-operated ball supply device 26 so as to communicate with the present ball passage portion.

In the portion of the ball passage of the ball delivery device 14 that is situated more downstream of the communicating portion of the hand-operated ball supply device 26, there is disposed ball passage number count device 28 which is used to count the number of balls that passes through the ball passage.

Figure 2A:
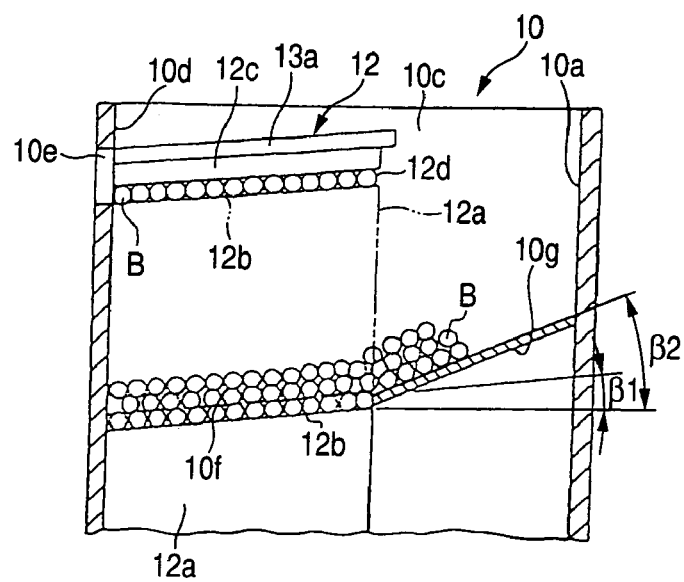
FIG. 2A is a schematically longitudinal section view of a ball storage portion, taken along the line II(A)—II(A) shown in FIG. 1; and, FIG. 2B is a schematically transverse section view of the ball storage portion, taken along the line II(B)—II(B) shown in FIG. 1.
Figure 2B:
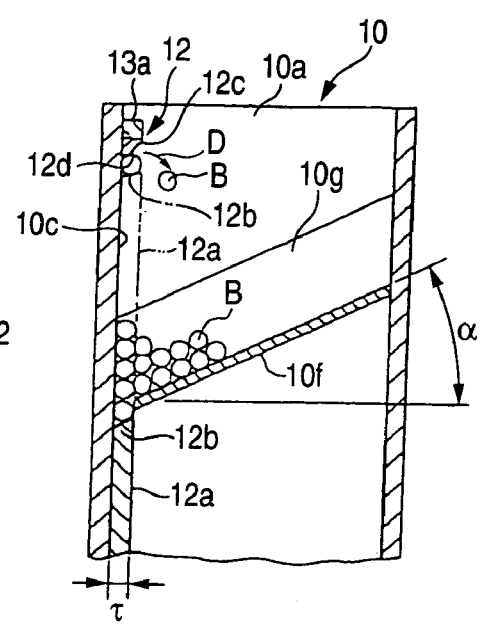

Next, description will be given below in detail of the details of the structure of the ball given quantity supply apparatus according to the invention, which is described above with reference to FIG. 1, and the remaining drawings as the need arises. By the way, FIG. 2A is a schematically longitudinal section view of the ball storage portion 10, taken along the line II(A)—II (A) shown in FIG. 1; and, FIG. 2B is a schematically transverse section view of the ball storage portion 10, taken along the line II(B)—II (B) shown in FIG. 1.

The ball storage portion 10 includes a ball receiving recessed portion 10*a* for receiving a plurality of balls B; and, the ball receiving recessed portion 10*a* has a structure in which a plurality of balls B stored in the ball receiving recessed portion 10*a* can be arranged due to gravity along a given area of the inner peripheral surface of the ball receiving recessed portion 10*a*.

In more detail, the ball receiving recessed portion 10*a* of the ball storage portion 10 according to the present embodiment has a square-shaped flat surface shape, while one side (which is hereinafter referred to as a first side) of the inner peripheral surface of the ball receiving recessed portion 10*a* constitutes the above-mentioned given area; and, on the above-mentioned inner peripheral surface, at a given position of the above-mentioned inner peripheral surface which is situated in the vicinity of the upper end of one side 10*d* (which is hereinafter referred to as a second side) of two sides intersecting the first side 10*c* and also is present along the first side 10*c*, there is formed a ball supply opening 10*e* serving as a base end from which the ball delivery device 14 is extended.

The bottom wall of the ball storage portion 10 includes a first bottom wall area 10*f* situated near to the second side 10*d* and a second ball wall area 10*g* distant from the second side 10*d*. The first bottom wall area 10*f* and second bottom wall area 10*g*, as shown in FIG. 2B, are respectively inclined downwardly as they approach the first side 10*c*. And, the inclination angle α thereof is set in such a manner that, even in case where a plurality of balls B stored in the ball receiving recessed portion 10*a* of the ball storage portion 10 are covered with oil having a relatively high coefficient of viscosity such as anticorrosive oil so as to be supplied to e.g. a bearing, a ball screw and a linear guide, the balls B arranged on the first bottom wall area 10*f* and second bottom wall area 10*g* are allowed to move positively toward the first side 10*c* due to gravity.

The first bottom wall area 10*f* and second bottom wall area 10*g*, as shown in FIG. 2A, are further respectively inclined downwardly as they approach the second side 10*d*, while the inclination angle β2 of the second bottom wall area 10*g* is set larger than the inclination angle β1 of the first bottom wall area 10*f*. The inclination angles β1 and β2 are respectively set in such a manner that, even in case where a plurality of balls B stored in the ball receiving recessed portion 10*a* of the ball storage portion 10 are covered with oil having a relatively high coefficient of viscosity such as anticorrosive oil to be supplied to e.g. a bearing, a ball screw and a linear guide, the balls B arranged on the first bottom wall area 10*f* and second bottom wall area 10*g* are allowed to move positively toward the first side 10*c* due to gravity.

As can be seen clearly from the foregoing detailed description, in the ball storage portion 10 according to the present embodiment, since the first bottom wall area 10*f* and second bottom wall area 10*g* of the ball receiving recessed portion 10*a* are respectively inclined in the above-mentioned manner, even in case where a plurality of balls B stored in the ball receiving recessed portion 10*a* of the ball storage portion 10 are covered with oil having a relatively high coefficient of viscosity such as anticorrosive oil so as to be supplied to e.g. a bearing, a ball screw and a linear guide, the balls B can be arranged along the first side 10*c*, which constitutes the given area of the inner peripheral surface of the ball receiving recessed portion 10*a*, due to gravity.

The ball arranging device 12, which is used to arrange a plurality of balls B stored in the ball storage portion 10 in a line, includes a plate-shaped ball gather-up member 12*a* which can be moved up and down in a given range along the first side 10*c*. The ball gather-up member 12*a* extends along the portion of the first side 10*c* that corresponds to the first bottom wall area 10*f* and, as shown by solid lines in FIGS. 2A and 2B, can be moved up and down between a lower end position and an upper end position by conventionally-known vertically driving device (not shown): that is, the lower end position is a position in which the upper end face 12*b* of the ball gather-up member 12*a* is situated slightly downwardly of the side edge of the first bottom wall area 10*f* along the first side 10*c*; and, the upper end position is a position in which the upper end face 12*b* is made to correspond to the lower end of the opening 10*e* of the second side 10*d* of the inner peripheral surface of the ball storage portion 10.

The upper end face 12*b* of the ball gather-up member 12*a* has a width T larger than the radius of the ball B. Also, the upper end face 12*b*, as shown clearly in FIGS. 2A and 2B, is inclined similarly to the first bottom wall area 10*f*. That is, the upper end face 12*b* is inclined in such a manner that it goes downwardly not only as it approaches the first side 10*c* but also as it approaches the second side 10*d*.

The ball arranging device 12 further includes a ball restricting member 12*c* which is fixed to the first side 10*c* in such a manner that it is spaced upwardly by a given distance from the upper end face 12*b* of the ball gather-up member 12*a* held at the upper end position. The ball restricting member 12*c* includes a lower end face 12*d* which extends in parallel to the upper end face 12*b* in such a manner that it is spaced upwardly by a given distance from the upper end face 12*b* of the ball gather-up member 12*a* held at the upper end position. The above-mentioned given distance is a distance which is slightly larger than the diameter of the ball B; and, the lower end face 12*d* as well, similarly to the upper end face 12*b* of the ball gather-up member 12*a*, has a width T larger than the radius of the ball B. The lower end face 12*d* further, as clearly shown in FIGS. 2A and 2B, similarly to the upper end face 12*b* of the ball gather-up member 12*a*, is inclined downwardly not only as it approaches the first side 10*c* but also as it approaches the second side 10*d*. And, the inclination angle of the lower end surface 12*d* of the ball restricting member 12*c* with respect to the first side 10*c* is set smaller than the inclination angle of the upper end face 12*b* of the ball gather-up member 12*a*.

According to the ball arranging device 12 structured in this manner, while a plurality of balls B stored in the ball receiving recessed portion 10*a* of the ball storage portion 10 being arranged due to gravity along the first side 10*c* constituting the given area of the inner peripheral surface of the ball receiving recessed portion 10*a* in the above-mentioned manner, the ball gather-up member 12*a* is moved upwardly from the lower end position to the upper end position to thereby be able to gather the plurality of balls B situated on the upper end face 12*b* of the ball gather-up member 12*a* along the first side 10*c* up to the upper end position. The number of balls B that can be arranged on the upper end face 12*b* of the ball gather-up member 12*a* can be set arbitrarily according to the diameter of the ball B and the length of the portion of the upper end face 12*b* that extends along the first side 10*c*.

In case where the ball gather-up member 12*a* approaches the upper end position, even when a plurality of balls B are arranged in a plurality of stages in the vertical direction on the upper end face 12*b* of the ball gather-up member 12*a*, other balls B than a given number of balls B arranged directly on the upper end face 12*b* of the ball gather-up member 12*a* in a line on the first stage, as shown by the arrow mark D in FIG. 2B, are pushed down into the ball receiving recessed portion 10*a* of the ball storage portion 10 by the lower end face 12*d* of the ball restricting member 12*c*.

That is, at the time when the ball gather-up member 12*a* reaches the upper end position, as clearly shown in FIG. 2A, on the upper end face 12*b* of the ball gather-up member 12*a*, there are arranged a given number of balls B in a line.

The above functions, which are provided by the ball gather-up member 12*a* and ball restricting member 12*c* of the ball arranging device 12, are fulfilled quickly and positively even in case where the balls B are balls which are covered with oil having a relatively high coefficient of viscosity such as anticorrosive oil so as to be supplied to e.g. a bearing, a ball screw and a linear guide.

And, after the ball gather-up member 12*a* reaches the upper end position, a given number of balls B arranged on the upper end face 12*b* of the ball gather-up member 12*a* can be supplied into the ball supply opening 10*e* of the second side 10*d* of the ball receiving recessed portion 10*a* of the ball storage portion 10 due to gravity. This ball supply is also carried out quickly and positively even in case where the balls B are balls which are covered with oil having a relatively high coefficient of viscosity such as anticorrosive oil so as to be supplied to e.g. a bearing, a ball screw and a linear guide.

According to the present embodiment, the ball arranging device 12, as shown in FIG. 1, further includes ball forced supply device 13 which can forcibly supply a given number of balls B, which are arranged in a line by the ball arranging device 12 as described above, into the ball passage of the ball delivery device 14 extended from the ball supply opening 10*e* more quickly and positively.

The ball forced supply device 13, as shown in FIGS. 2A and 2B, includes a guide rail member 13*a* fixed to the upper portion of the ball restricting member 12*c* in the first side 10*c* of the inner peripheral surface of the ball receiving recessed portion 10*a* of the ball storage portion 10. The guide rail member 13*a* includes a guide rail (not shown) which extends in parallel to the lower end face 12*d* of the ball restricting member 12*c*, that is, the upper end face 12*b* of the ball gather-up member 12*a*.

The ball forced supply device 13, as shown in FIG. 1, further includes a ball push-in member 13*b* the movement of which can be guided by the guide rail of the guide rail member 13*a*. When it is guided by the guide rail, the ball push-in member 13*b* can be moved through a clearance having the above-mentioned given distance between the upper end face 12*b* of the ball gather-up member 12*a* held at the upper end position and the lower end face 12*d* of the ball restricting member 12*c* along the first side 10*c*, upper end face 12*b* and lower end face 12*d*.

The ball forced supply device 13, as shown in FIG. 1, still further includes a linear reciprocation drive device 13*c* which is fixed to the first side 10*c* on the distant side from the second side 10*d* with respect to the ball restricting member 12*c*. According to the present embodiment, the linear reciprocation drive device 13*c* is composed of a piston-cylinder unit which can be driven using pressurized fluid pressure. The linear reciprocation drive device 13*c* is connected to the ball push-in member 13*b* and, while the ball gather-up member 12*a* is not held at the upper end position, separates the ball push-in member 13*b* from the clearance having the above-mentioned given distance between the upper end face 12*b* of the ball gather-up member 12*a* held at the upper end position and the lower end face 12*d* of the ball restricting member 12*c* on the distant side from the second side 10*d* with respect to the ball restricting member 12*c*.

And, in case where the ball gather-up member 12*a* is moved from the lower end position toward the upper end position and reaches the upper end position, the linear reciprocation drive device 13*c* of the ball forced supply device 13 pushes out the ball push-in member 13*b* into the clearance of the above-mentioned given distance between the upper end face 12*b* of the ball gather-up member 12*a* held at the upper end position and the lower end face 12*d* of the ball restricting member 12*c*, and allows the ball push-in member 13*b* to move forwardly until it reaches the ball supply opening 10*e*. In addition to the action of gravity, due to such forward motion of the ball push-in member 13*b*, a given number of balls B arranged on the upper end face 12*b* of the ball gather-up member 12*a* after it reaches the upper end position can be forcibly supplied more quickly and positively into the ball supply opening 10*e* of the second side 10*d* of the ball receiving recessed portion 10*a* of the ball storage portion 10.

After the ball push-in member 13*b* reaches the ball supply opening 10*e*, while the ball gather-up member 12*a* is lowered down to the lower end position and is raised up to the upper end position again, the linear reciprocation drive device 13*c* of the ball forced supply device 13 drives the ball push-in member 13*b* to move backwardly, that is, move away from the clearance of the above-mentioned given distance between the upper end face 12*b* of the ball gather-up member 12*a* held at the upper end position and the lower end face 12*d* of the ball restricting member 12*c* to the distant side from the second side 10*d* with respect to the ball restricting member 12*c*.

Next, description will be given below in detail of structure of the ball delivery device 14 that is extended from the ball supply opening 10*e* of the second side 10*d* of the ball storage portion 10 with reference to FIGS. 1 and 3. By the way, FIG. 3 is a schematically transverse section view taken along the line III—III shown in FIG. 1.

The ball delivery device 14 includes a base member 14a extended from the lower end of the ball supply opening 10e of the second side 10d of the ball storage portion 10, a side plate 14b fixed to one side edge of the base member 14a and extended from and along the present one side edge of the ball supply opening 10e, and a cover 14c placed over the upper surface of the base member 14a and extended from the upper end of the ball supply opening 10e along the present upper surface.

Figure 3:
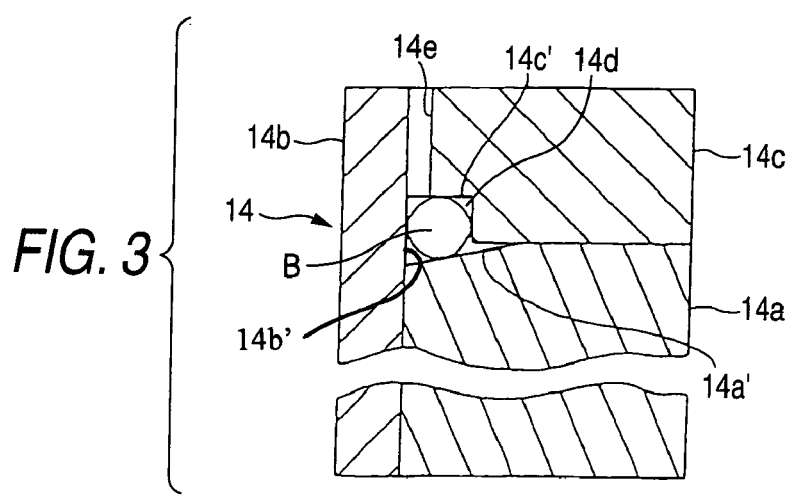
FIG. 3 is a schematically transverse section view taken along the line III—III shown in FIG. 1.

Referring to the structure of the upper surface of the base member 14a, the area 14a' thereof situated next to the side plate 14b, as shown clearly in FIG. 3, is inclined downwardly as it approaches the side plate 14b and also is inclined downwardly as it goes away from the ball supply opening 10e. And, the present upper surface is curved in such a manner that it goes downwardly in the portion thereof situated near to the extended end of the base member 14a.

The area 14c' of the cover 14c facing the area 14a' of the base member 14a, as shown in FIG. 3, is cut away into a square shape. The square-shaped area 14c' of the cover 14c is extended along the area 14b' of the upper surface of the base member 14a from the ball supply opening 10e up to the extended end of the area 14b'.

The side surface of the side plate 14b on the base member 14a side, the area 14a' of the base member 14a, and the area 14c' of the cover 14c, as shown in FIG. 3, cooperate together in forming a ball passage 14d having a substantially square-shaped cross section, while the ball passage 14d has a width and a height both slightly larger than the diameter of the ball B. And, the ball passage 14d having a substantially square-shaped cross section generates, between the outer peripheral surfaces of the balls B passing through the ball passage 14d and the four corners of the section of the ball passage 14d, fluid passage clearances which allow a fluid to pass easily therethrough.

The balls B supplied from the ball supply opening 10e of the second side 10d of the ball storage portion 10 into the ball passage 14d of the ball delivery device 14 are rolled on the area 14a' of the upper surface of the base member 14a down to the extended end of the ball passage 14d due to the above-mentioned inclination and action of gravity in the extended direction of the area 14a' of the upper surface of the base member 14a, whereby the balls B can be delivered. Such delivery of the balls B through the passage 14d can be carried out quickly and positively even when the balls B are balls which are covered with oil having a relatively high coefficient of viscosity such as anticorrosive oil and are to be supplied to e.g. a bearing, a ball screw and a linear guide.

The fluid passage clearances in the four corners of the cross section of the ball passage 14d can further facilitate the above delivery of the balls B. Also, since the downward inclination of the area 14a' of the upper surface of the base member 14a toward the side plate 14b causes the balls B during the above delivery to be always contacted with the side plate 14b, the balls B during the above delivery can be always contacted with the area 14a' of the upper surface of the base member 14a and side plate 14b at two points. This can stabilize the motion of the balls B during the above delivery; and thus, the above delivery can be carried out smoothly, quickly and positively. Further, simply by changing the dimensions of the cross section of the cut-away portion of the area 14c' of the cover 14c, the above-structured ball passage 14d enables even balls B having various diameters to be delivered easily with the above-mentioned various effects.

In addition, the cut-away portion of the area 14c' of the cover 14c can be structured in such a manner that the cross section of the ball passage 14d can have any one of various polygonal shapes including a triangle or more.

In the present embodiment, the length of the area of the ball passage 14d between the first gate device 16 and second gate device 18 is set substantially equal to the sum of the diameters of a given number of balls B to be arranged in a line on the upper end face 12b of the ball gather-up member 12a of the ball arranging device 12. In other words, this means that, in the area of the ball passage 14d between the first gate device 16 and second gate device 18, there can be held a given number of balls B to be arranged in a line on the upper end face 12b of the ball gather-up member 12a of the ball arranging device 12.

Next, description will be given below in more detail of the respective structures of the pressurized fluid jetting device 20 and operation control device 22 with reference to not only FIG. 1 but also FIGS. 4A, 4B and FIGS. 5A, 5B.

Figure 4A:
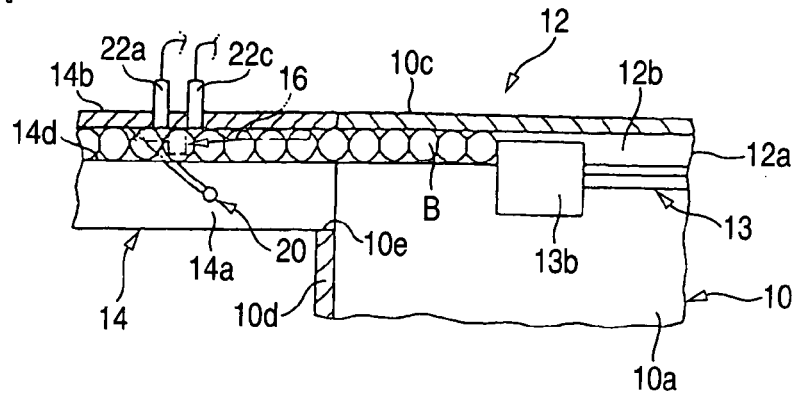
FIG. 4A is a schematically horizontal section view of the base end portion of ball delivery device which is disposed in the vicinity of the ball storage portion and in which first gate device and pressurized fluid jetting device are disposed, and the portion of the ball storage portion that adjoins the base end portion of the ball delivery device; and, FIG. 4B is a schematically longitudinal section view of the above base end portion of the ball delivery device and the portion of the ball storage portion adjoining the present base end portion.
Figure 4B:
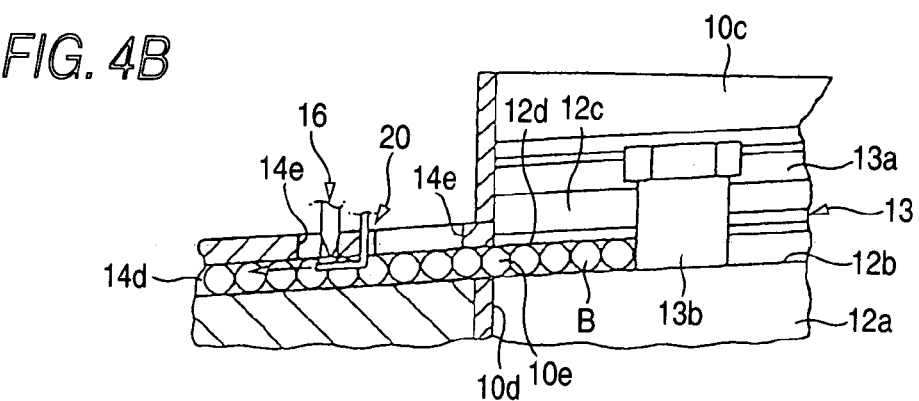

Here, FIG. 4A is a schematically horizontal section view of not only the base end portion of the ball delivery device 14 which is situated in the vicinity of the ball storage portion 10 and also in which the first gate device 16 and pressurized fluid jetting device 20 are disposed, but also the portion of the ball storage portion 10 that adjoins the present base end portion; and, FIG. 4B is a schematically longitudinal section view of the above base end portion of the ball delivery device 14 and the portion of the ball storage portion 10 adjoining the present base end portion.

Figure 5A:
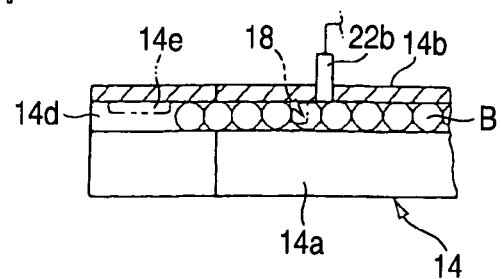
FIG. 5A is a schematically horizontal section view of the extended end portion of the ball delivery device which is distant from the ball storage portion and in which second gate device is disposed; and, FIG. 5B is a schematically longitudinal section view of the above extended end portion of the ball delivery device.
Figure 5B:
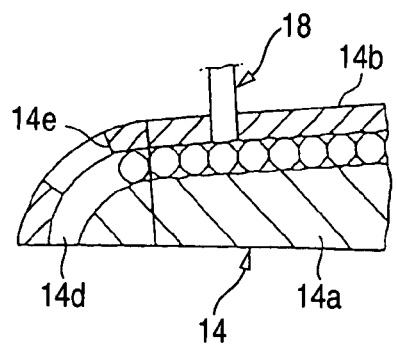

Also, FIG. 5A is a schematically horizontal section view of the extended end portion of the ball delivery device 14 which is distant from the ball storage portion 10 and also in which the second gate device 18 is disposed; and, FIG. 5B is a schematically longitudinal section view of the above extended end portion of the ball delivery device 14.

Referring to the structure of the pressurized fluid jetting device 20, as shown in FIGS. 4A and 4B, in the ball passage 14d of the ball delivery device 14, there is formed a jet-out opening in the upper corner portion of one inside surface of the ball passage 14d on the delivery direction side of the balls B in the ball passage 14d with respect to the first gate device 16. This jet-out opening faces in a direction which is inclined from the crossing direction of the ball passage 14 toward the above delivery direction.

A pressurized fluid, which is jetted out from the jet-out opening of the pressurized fluid jetting device 20, not only separates various substances attached to the surfaces of the balls B passing in front of the jet-out opening such as the above-mentioned oil from the present surfaces to a considerable degree but also forcibly discharges the above attached substances separated from the surfaces of the balls B up to the extended end of the ball passage 14d through spaces existing in the four corner portions of the cross section of the ball passage 14d.

Further, since the jet-out opening of the pressurized fluid jetting device 20 is inclined toward the above-mentioned delivery direction, not only the balls B supplied from the ball supply opening 10e of the second side 10d of the ball storage portion 10 can be prevented from being blown back toward the ball supply opening 10e by the pressurized fluid jetted out from the jet-out opening; but also, the quick supply of the balls B from the ball supply opening 10e into the ball passage 14d can be prevented from being made difficult.

According to the present embodiment, in the ball passage 14a of the ball delivery device 14, there are disposed two pressurized fluid discharge devices 14e respectively at a position in the vicinity of the first gate device 16 and at a position nearer to the extended end portion of the ball delivery device 14 than the second gate device 16. The pressurized fluid discharge devices 14e are used to discharge the pressurized fluid jetted out from the pressurized fluid jetting device 20 into the ball passage 14a to the outside of the ball passage 14a.

In more detail, as shown in FIG. 3 especially clearly, each of the pressurized fluid discharge device 14e is composed of a cut-away portion which is formed at a given position of the side surface of the cover 14c of the ball delivery device 14 that is contacted with the side wall 14b and also which penetrates through between the upper surface of the ball passage 14a and the upper surface of the cover 14c.

These pressurized fluid discharge device 14e relieve the sucking action of the pressurized fluid jetted out from the jet-out opening of the pressurized fluid jetting device 20 in the ball passage 14a of the ball delivery device 14, while the sucking action is an action which, based on the Bernoulli's theorem, is applied to the balls B passing in front of the pressurized fluid by the pressurized fluid. Such relief of the sucking action not only can avoid a possibility that, depending on the quantity and speed per unit time of the pressurized fluid jetted out from the jet-out opening, the balls B passing in front of the jet-out opening can be sucked by the jet-out opening and the delivery of the balls B in the ball passage 14a can be thereby stopped, but also permits the full display of the separating function of the pressurized fluid jetted out from the jet-out opening of the pressurized fluid jetting device 20 that separates various substances such as the above-mentioned oil attached to the surfaces of the balls B being delivered in the ball passage 14 from the present balls B surfaces.

The pressurized fluid discharge device 14e, especially, the pressurized fluid discharge device 14e situated in the vicinity of the second gate device 18 can further eliminate the possibility that the delivery speed of the balls B being delivered in the ball passage 14a can be increased by the pressurized fluid jetted out from the jet-out opening of the pressurized fluid jetting device 20 into the ball passage 14a and thus the balls B can be struck strongly against something such as the inner surface of the downward curved portion of the extended end portion of the ball passage 14a or the balls B can be collided with each other to be thereby damaged.

By the way, the pressurized fluid jetting device 20 can also be structured such that it can jet out the pressurized fluid intermittently. The intervals, start and end of the intermittent jetting-out operation of the pressurized fluid can be set arbitrarily.

The intermittent jetting operation of the pressurized fluid by the pressurized fluid jetting device 20, similarly to the pressurized fluid discharge device 14e, also relieves the sucking action of the pressurized fluid jetted out from the jet-out opening of the pressurized fluid jetting device 20 in the ball passage 14a of the ball delivery device 14, while the sucking action is an action which, based on the Bernoulli's theorem, is applied to the balls B passing in front of the pressurized fluid by the pressurized fluid. Such relief of the sucking action not only can avoid a possibility that, depending on the quantity and speed per unit time of the pressurized fluid jetted out from the jet-out opening, the balls B passing in front of the jet-out opening can be sucked by the jet-out opening and the delivery of the balls B in the ball passage 14a can be thereby stopped, but also permits the full display of the separating function of the pressurized fluid jetted out from the jet-out opening of the pressurized fluid jetting device 20 that separates various substances such as the above-mentioned oil attached to the surfaces of the balls B being delivered in the ball passage 14 from the present balls B surfaces.

The operation control device 22 includes a first ball detector 22a disposed in the ball passage 14a of the ball delivery device 14 so as to adjoin the downstream side of the first gate device 16, and a second ball detector 22b disposed so as to adjoin the upstream side of the second gate device 18. In the present embodiment, the operation control device 22 further includes a third ball detector 22c disposed in the ball passage 14a of the ball delivery device 14 so as to adjoin the upstream side of the first gate 16.

As the first to third ball detectors 22a, 22b and 22c, there can be used various kinds of detectors, provided that they are able to detect positively the balls B passing just in front of them in the ball passage 14a. In case where the balls B are made of metal, as the first to third ball detectors 22a, 22b and 22c, there can be used metal approach detectors; and, in case where the balls B are made of metal or nonmetal, there can also be used optical detectors. Also, the first to third ball detectors 22a, 22b and 22c may be detectors of the same kind or detectors of different kinds.

By the way, even in case where the balls B passing through the ball passage 14a of the ball delivery device 14 are balls which are covered with oil having a relatively high coefficient of viscosity such as anticorrosive oil so as to be supplied to e.g. a bearing, a ball screw and a linear guide, since the pressurized fluid blown into the ball passage 14a by the pressurized fluid jetting device 20 can separate the above-mentioned oil attached to the balls B to a considerable degree, the precision of the first to third ball detectors 22a, 22b and 22c can be always maintained at a high level.

Next, description will be given below in detail of the ball passage number count device 28 with reference to FIG. 1 as well as FIGS. 6A and 6B.

Figure 6A:
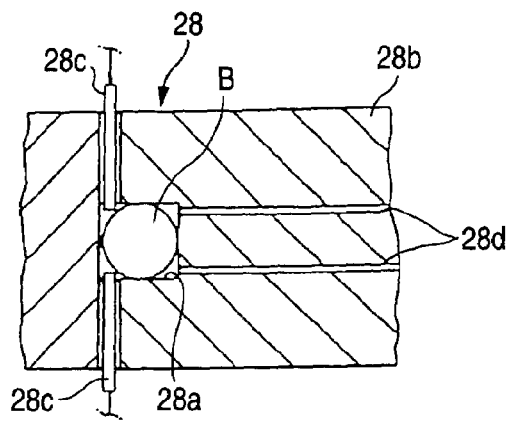
FIG. 6A is a schematically horizontal section view of ball passage number count device; and, FIG. 6B is a schematically longitudinal section view of the ball passage number count device.
Figure 6B:
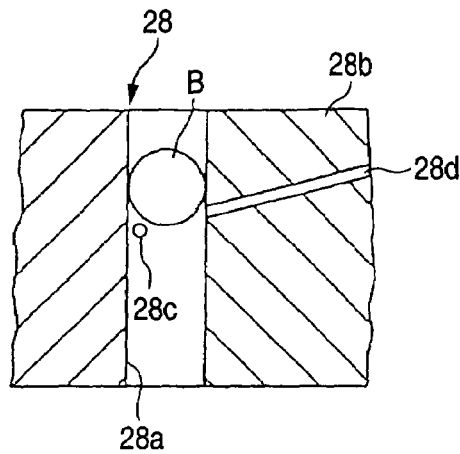

Here, FIG. 6A is a schematically horizontal section view of the ball passage number count device 28; and, FIG. 6B is a schematically longitudinal section view of the ball passage number count device 28.

The ball passage number count device 28 is interposed between the extended end of the ball passage 14a of the ball delivery device 14 and ball supply tube 24. The ball passage number count device 28 includes a count device hold member 28b having a ball passage 28a which allows the extended end of the ball passage 14a of the ball delivery device 14 and ball supply tube 24 to communicate with each other. The cross section shape and dimension of the ball passage 28a are substantially equal to the cross section shape and dimension of the ball passage 14a of the ball delivery device 14. That is, the cross section shape of the ball passage 28a is a rectangular shape which has length and width dimensions slightly larger than the diameter of the balls B.

In the ball passage 28a, there is disposed a ball passage detector 28c which is capable of detecting that the balls B passes through the ball passage 28a. In the present embodiment, the ball passage detector 28c is composed of a pair of optical sensors respectively connected to the operation control device 22. However, in case where the balls B are made of metal, there can also be used a metal approach detector. The pair of optical sensors are shut off from the light by the ball B each time the ball B passes through the ball passage 28a and they transmit signals generated as a result of this to the operation control device 22; and, count device (not shown) included in the operation control device 22, based on the above signals, counts the number of balls B that passes through the ball passage 28a.

The ball passage number count device 28 further includes a pair of pressurized fluid jet-out holes 28*d* which jet out the pressurized fluid toward the pair of optical sensors in the ball passage 28*a*.

The pressurized fluids jetted out from the pair of pressurized fluid jet-out holes 28*d* prevent dirty substances from being attached to the pair of optical sensors and thus can prevent the malfunction of the pair of the optical sensors. The jetting of the pressurized fluids from the pair of pressurized fluid jet-out holes 28*d* is carried out during the time after the ball passage number count device 28 counts the passage of a given number of balls B through the ball passage 28*a* before a next given number of balls B are supplied into the ball passage 28*a*, in order to be able to prevent the present pressurized fluid jetting from impeding the quick passage of the balls B in the ball passage 28*a*. Such pressurized fluid jetting may be carried out continuously or intermittently. That is, in the case of the ball passage number count device 28 according to the present embodiment, even in case where the balls B passing through the ball passage 28*a* are balls which are covered with oil having a relatively high coefficient of viscosity such as anticorrosive oil so as to be supplied to e.g. a bearing, a ball screw and a linear guide, thanks to the pressurized fluids jetted out from the pair of pressurized fluid jet-out holes 28*d*, dirt including the above-mentioned oil can be prevented from sticking to the pair of optical sensors, which allows the pair of optical sensors to always operate with good precision.

Next, description will be given below in detail of the structure of the hand-operated ball supply device 26 with reference to FIGS. 7A and 7B.

Figure 7A:
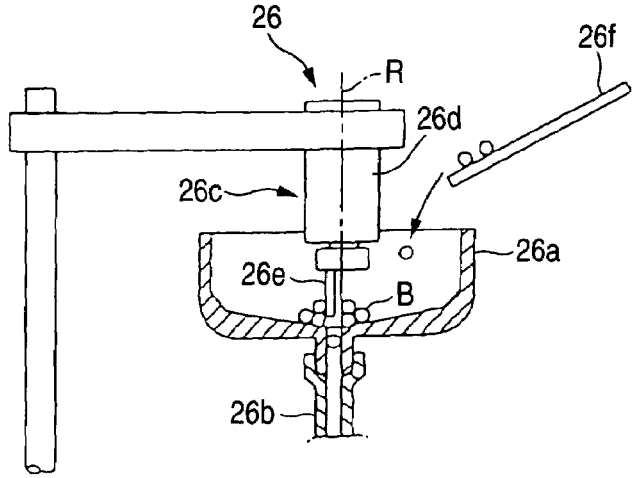
FIG. 7A is a schematically longitudinal section view of the main portions of hand-operated ball supply device; and, FIG. 7B is a partially enlarged longitudinal section view of part of the above main portions.
Figure 7B:
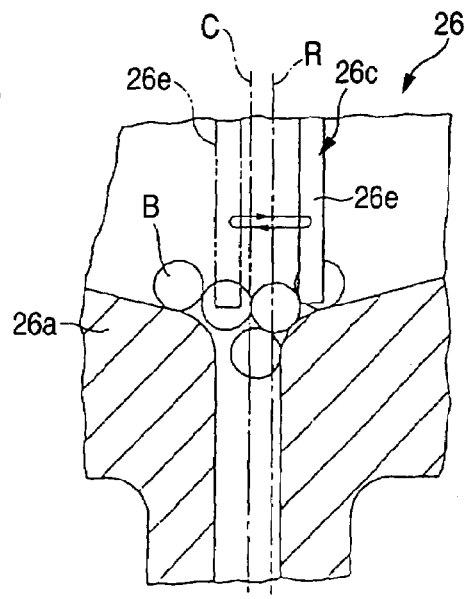

Here, FIG. 7A is a schematically longitudinal section view of the main portions of the hand-operated ball supply device 26; and, FIG. 7B is a partially enlarged longitudinal section view of part of the above main portions.

In the present embodiment, the hand-operated ball supply device 26 includes a funnel-shaped ball throw member 26*a* and a ball guide member 26*b* which is extended from the central portion of the bottom surface of the ball throw member 26*a* to the downstream side of the second gate device 18 in the ball passage 14*a* of the ball delivery device 14 and is allowed to communicate with the present downstream side. And, the communicating position of the ball guide member 26 with respect to the ball passage 14*a* of the ball delivery device 14 is set between the extended end of the ball passage 14*a* of the ball delivery device 14 and ball passage number count device 28.

That is, the number of balls B supplied by hand to the extended end of the ball passage 14*a* of the ball delivery device 14 through the hand-operated ball supply device 26 can also be counted accurately by the ball passage number count device 28.

In the present embodiment, the hand-operated ball supply device 26 further includes ball mixing device 26*c* which mixes a plurality of balls B thrown into the ball throw member 26*a* in the central portion of the bottom surface of the ball throw member 26*a* to thereby prevent the plurality of balls B from being clogged in the entrance of the ball guide member 26*b* in the present central portion. The ball mixing device 26*c* comprises a motor 26*d* including an output shaft having a rotation center axis R eccentric to the center C of the entrance of the ball guide member 26*b* in the central portion of the bottom surface of the ball throw member 26*a*, and a mixing rod 26*e* eccentrically fixed to the above output shaft. In case where the output shaft of the motor 26*d* is rotated in a given direction, as shown clearly in FIG. 7B, the mixing rod 26*e* moves around the output shaft of the motor 26*d* having a rotation center axis R eccentric to the center C of the entrance of the ball guide member 26*b* in the central portion of the bottom surface of the ball throw member 26*a*.

The locus of the movement of the mixing rod 26*e* around the output shaft crosses the entrance of the ball guide member 26*b* in the central portion of the bottom surface of the ball throw-in member 26*a*.

Into the ball throw member 26*a* of the hand-operated ball supply device 26, there can be thrown a given number of balls B using a known ball given quantity plate 26*f*. The given number of balls B thrown into the ball throw member 26*a* are allowed to roll toward the entrance of the ball guide member 26*b* in the central portion of the bottom surface of the ball throw member 26*a* due to gravity, and move one by one into the ball guide member 26*b* through the above entrance. During this, there is a possibility that the given number of balls B collecting together in the entrance can be butted against each other to thereby prevent each other from moving into the ball guide member 26 through the entrance. However, such mutual butting between the given number of balls B in the entrance can be solved immediately in case where they are mixed by the eccentric mixing rod 26*e* of the ball mixing device 26*c* moving around the output shaft of the motor 26*d*, so that the supply of the given number of balls B one by one into the ball guide member 26*b* through the entrance can be resumed immediately.

In the above-mentioned embodiment, all structures that can operate using the pressurized fluid, that is, the linear reciprocation drive device 13*c* of the ball forced supply device 13, first and second gate device 16 and 18, pressurized fluid jetting device 20, and the pair of pressurized fluid jet-out holes 28*d* of the ball passage number count device 28 are allowed to communicate with a pressurized fluid source 32 through a pressurized fluid supply control device 30 including e.g. an electromagnetic valve (not shown). The operation of the pressurized fluid supply control device 30 is also controlled by the operation control device 22.

As the above-mentioned pressurized fluid, there can be selected proper kinds of pressurized fluids according to the kinds of the balls B that are supplied in the above-mentioned embodiment, while the pressurized air is just a typical example.

Next, description will be given below of a series of operations of the ball given quantity supply apparatus according to the present embodiment structured in the above-described manner.

As shown in FIGS. 2A and 2B, while a large number of balls B are stored in the ball receiving recessed portion 10*a* of the ball storage portion 10, the gather-up plate 12*a* of the ball arranging device 12 is moved from the lower end position shown by a solid line up to the upper end position shown by a two-dot chained line, and a given quantity of balls B, that is, a given number of balls B are arranged in a line on the upper end face 12*b* of the gather-up plate 12*a* held at the upper end position.

After the gather-up plate 12*a* of the ball arranging device 12 is held at the upper end position, the linear reciprocation drive device 13*c* of the ball forced supply device 13 shown in FIG. 1 pushes out the ball push-in member 13*b* toward the ball supply opening 10*e* of the second side 10*d* of the ball storage portion 10. As a result of this, a given quantity of, that is, a given number of balls B arranged in a line on the upper end face 12*b* of the gather-up plate 12*a* after it is held at the upper end position are quickly and positively supplied in a line to the ball supply opening 10*e* not only due to the action of gravity but also by the ball push-in member 13*b*.

Here, in case where a given quantity of, that is, a given number of balls B arranged in a line on the upper end face 12b of the gather-up plate 12a after it is held at the upper end position can be always moved quickly and positively toward the ball supply opening 10e only due to the action of gravity, the operation of the pressurized fluid supply control device 30 can also be controlled by the operation control device 22 in such a manner that the linear reciprocation drive device 13c of the ball forced supply device 13 does not push out the ball push-in member 13b toward the ball supply opening 10e of the second side 10d of the ball storage portion 10.

When the supply of the above-mentioned given quantity, that is, the above-mentioned given number of balls B arranged in a line to the ball supply opening 10e is started, the first and second gate device 16, 18 close the ball passage 14d of the ball delivery device 14.

In case where the third ball detector 22c adjoining the upstream side of the first gate device 16 in the ball passage 14d detects the balls B for the first time, as shown in FIGS. 4A and 4B, the first gate device 16 is opened and, at the same time, the pressurized fluid jetting device 20 adjoining the downstream side of the second gate device 16 starts to jet out the pressurized fluid. This pressurized fluid jetting, as is described in detail of the pressurized fluid jetting device 20 with reference to FIGS. 4A and 4B, may be carried out continuously or intermittently according to cases; and, the period of the continuous jetting as well as the period of the intermittent jetting and the intervals between the intermittent jetting operations can also be set freely by controlling the operation of the pressurized fluid supply control device 30 using the operation control device 22.

In the case of the above-mentioned given quantity, that is, the above-mentioned given number of balls B in a line which passes through the first gate device 16 in the ball passage 14d and also from the surfaces of which the attached substances are separated to a considerable degree by the pressurized fluid jetting device 20, the delivery of the balls B in the ball passage 14d is stopped by the second gate device 18 held at its closed position.

In case where not only the second ball detector 22b adjoining the upstream side of the second gate device 18 held at the closed position in the ball passage 14 detects the leading ball B of the balls B in the above-mentioned line for a given period of time or more but also the first ball detector 22a adjoining the downstream side of the first gate device 16 at the open position in the ball passage 14d detects the last ball B of the balls B in the same line, it can be confirmed that the above-mentioned given quantity, that is, the above-mentioned given number of balls B in a line are held between the second gate device 18 at the closed position and first gate device 16 at the open position in the ball passage 14d.

By the way, in case where, after the second ball detector 22b adjoining the upstream side of the second gate device 18 detects the ball B for a given period of time or more, the first ball detector 22a adjoining the downstream side of the first gate device 16 does not detect the ball B for a given period of time or more, it can be confirmed that a given number of balls B are not stored in a given area between the second gate device 18 and first gate device 16 in the ball passage 14d. That is, this means that a given number of balls B arranged in a line by the ball arranging device 12 are not supplied properly to the ball passage 14d through the ball supply opening 10e of the ball storage portion 10.

In this case, while maintaining the open condition of the first gate device 16 and the closed condition of the second gate device 18, the supply of a plurality of balls B in a line arranged by the ball arranging device 12 is to be carried out again.

To prevent such ball supply failure positively, after the supply of a given number of balls B from the upper end face 12b of the ball gather-up member 12a at the upper end position into the ball passage 14d of the ball delivery device 14 is started, until the first to third ball detectors 22a, 22b and 22c respectively detect the balls B for a given period of time or more, while maintaining the open condition of the first gate device 16 and the closed condition of the second gate device 18, the supply of a given number of balls B into the ball passage 14d of the ball delivery device 14 by the ball gather-up member 12a should be carried out repeatedly.

In case where the first and second ball detectors 22a and 22b detect the balls B for a given period of time or more, or, in case where, as described above, the first to third ball detectors 22a, 22b and 22c respectively detect the balls B for a given period of time or more, the first gate device 16 is moved to the closed position and, at the same time, the second gate device 18 is moved to the open position; or, after the passage of a given time set by a timer (not shown) after the first gate device 16 is moved to the closed position, the second gate device 18 is moved to the open position; and, further, the ball gather-up plate 12a is returned from the upper end position to the lower end position and, at the same time, the ball push-in member 13b of the ball forced supply device 13 is pulled back to its retreat position which is most distant from the ball supply opening 10e of the second side 10d of the ball storage portion 10.

In the case of the above-mentioned given quantity of, that is, the above-mentioned given number of balls B in a line that passes through the second gate device 18 which is opened, after they pass through the extended end of the passage 14a of the ball delivery device 14 and the number of the balls B in the line is confirmed by the ball passage number count device 28, they are supplied through the ball supply tube 24 into a ball inserting apparatus (not shown) which is used to insert a given quantity of balls into an apparatus using a given quantity of balls such as a bearing, a ball screw and a linear guide.

By the way, the ball passage number count device 28 can also be omitted and the counting of the ball passage number can also be left stopped.

In case where the second ball detector 22b adjoining the upstream side of the second gate device 18 at the open position in the ball passage 14d fails to detect the-passage of the above-mentioned balls B in a line, the second gate device 18 is moved from the open position to the closed position. Also, the jetting of the pressurized fluid by the pressurized fluid jetting device 20 is stopped. In the case of the inter-mitting jetting of the pressurized fluid, after the second ball detector 22b fails to detect the passage of the above balls B in a line, the pressurized fluid is finally jetted out for a longer period of time than the given period of time in the intermittent jetting and, after then, the jetting of the pressurized fluid is stopped.

In the ball given quantity supply apparatus according to the present embodiment, as can be seen clearly from the. foregoing detailed description of the hand-operated ball supply device 26 with reference to FIGS. 7A and 7B, a given quantity of, that is, a given number of balls B can be manually supplied through the hand-operated ball supply device 26 into a ball inserting apparatus (not shown) which inserts a given quantity of balls into an apparatus using a given quantity of balls such as a bearing, a ball screw and a linear guide.

And, in this case as well, a given quantity of, that is, a given number of balls B to be supplied from the hand-operated supply device 26 to the above-mentioned ball inserting apparatus (not shown), after the number of the above balls B in a line is confirmed by the ball passage number count device 28, are supplied through the ball supply tube 24 to the ball inserting apparatus (not shown) which inserts a given quantity of balls into an apparatus using a given quantity of balls such as a bearing, a ball screw and a linear guide.

Further, description will be given below of the preferred embodiments of an apparatus for assembling a ball screw apparatus with reference to the accompanying drawings.

Figure 8:
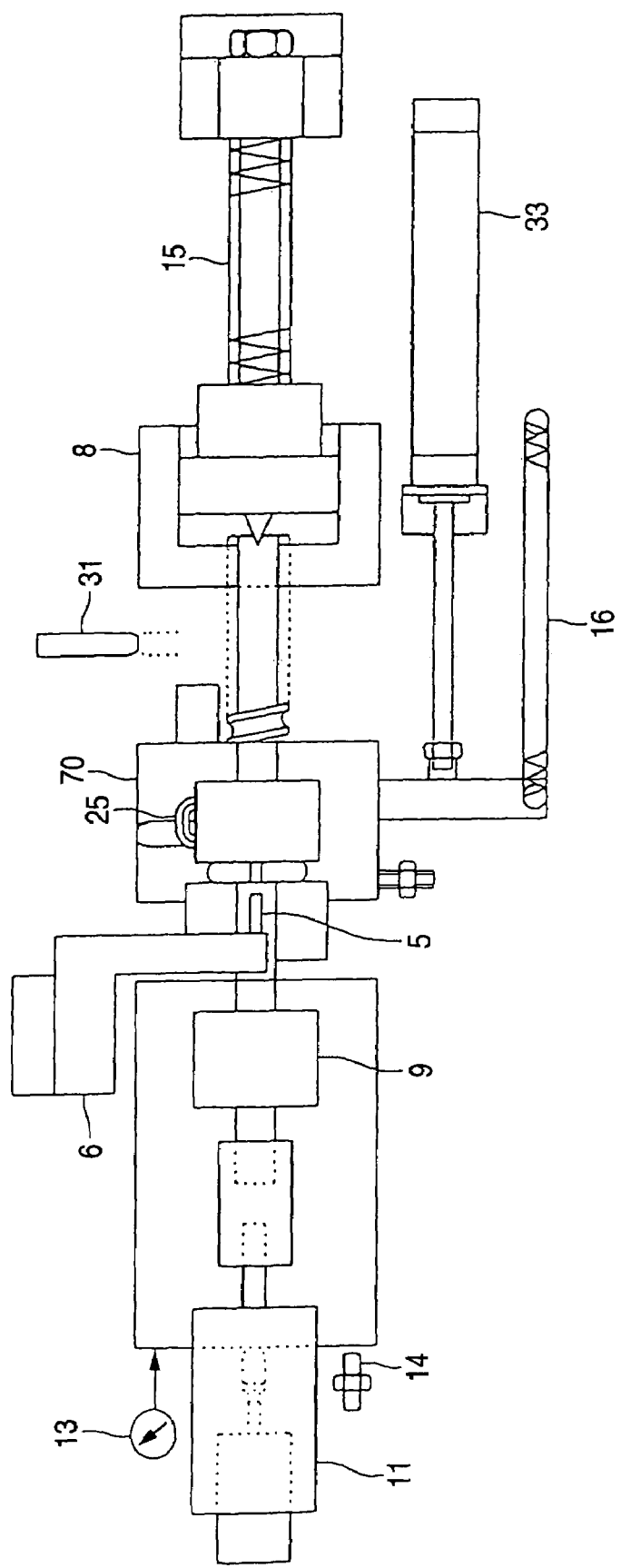
FIG. 8 is an explanatory plan view of an embodiment of an apparatus for assembling a ball screw apparatus according to the invention.
Figure 9:
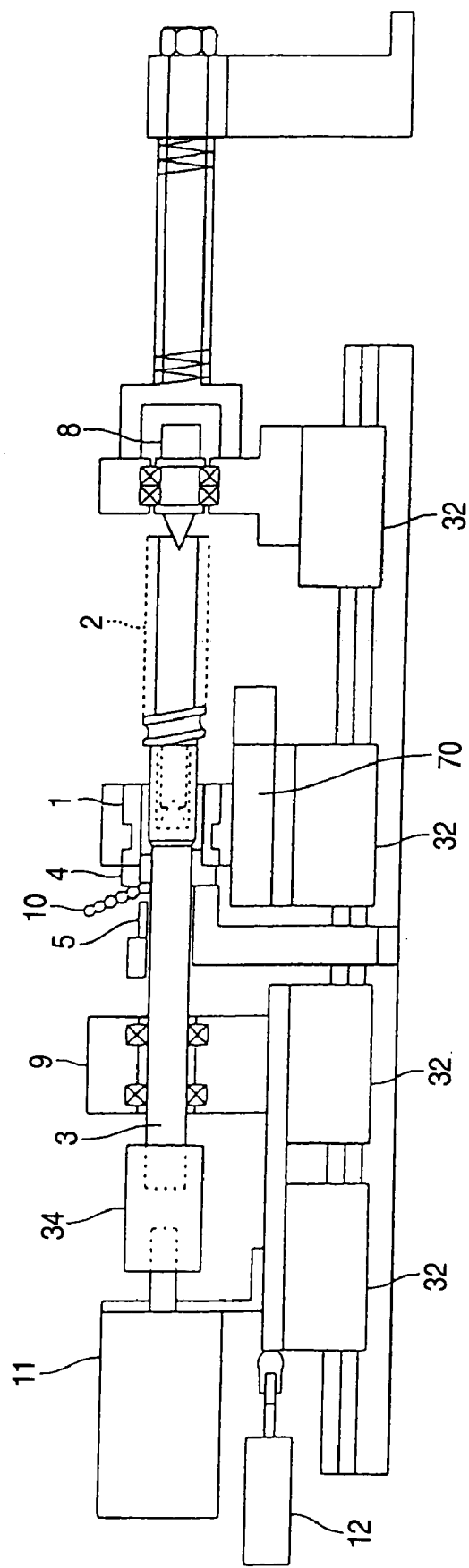
FIG. 9 is a front view of FIG. 8.
Figure 10A:
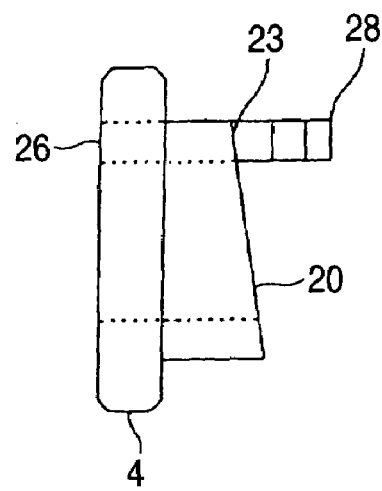
FIG. 10A is an explanatory view of a ball insertion jig.
Figure 10B:
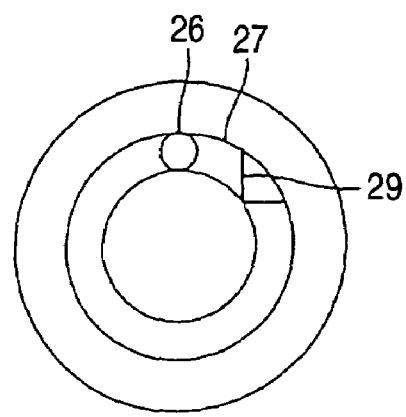
FIG. 10B is a view of the ball insertion jig, when it is viewed from the right side of FIG. 10A; and, FIG. 10C is a view of the ball insertion jig, when it is viewed from the top side of FIG. 10A.
Figure 10C:
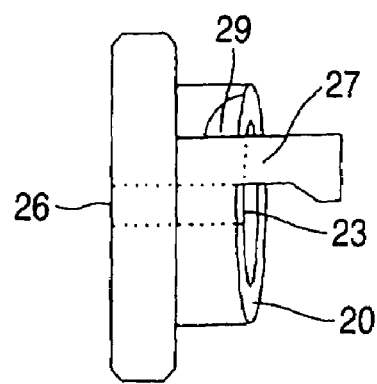
Figure 11:
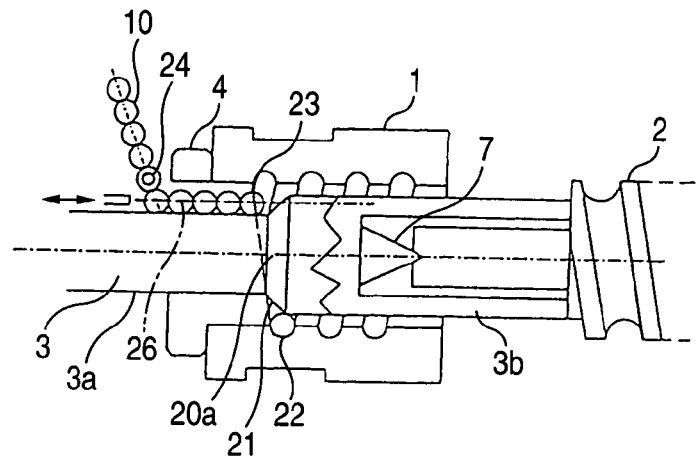
FIG. 11 is an explanatory view of the main portions of the apparatus for assembling a ball screw apparatus; in particular, an explanatory section view of a nut and a ball insertion jig, when they are viewed from the lateral side thereof.
Figure 12A:
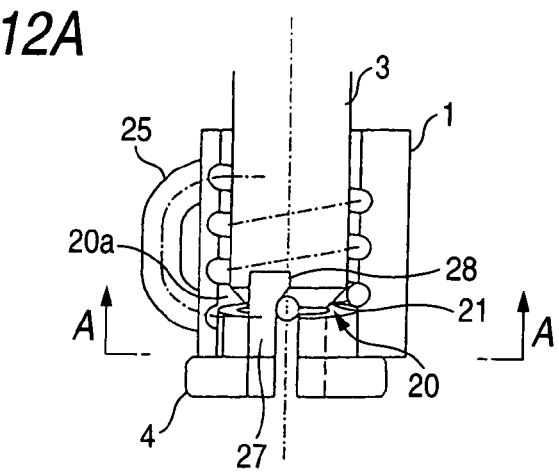
FIG. 12A is an explanatory section view of the nut and ball insertion jig, when they are viewed from the top side thereof; and, FIG. 12B is a section view taken along the line A—A shown FIG. 12A.
Figure 12B:
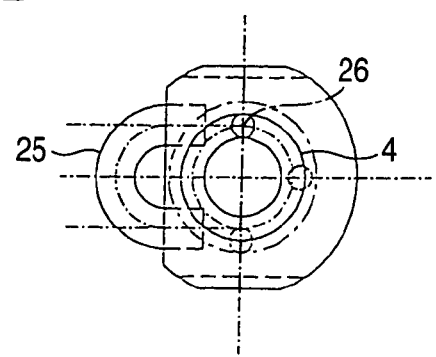
Figure 13A:
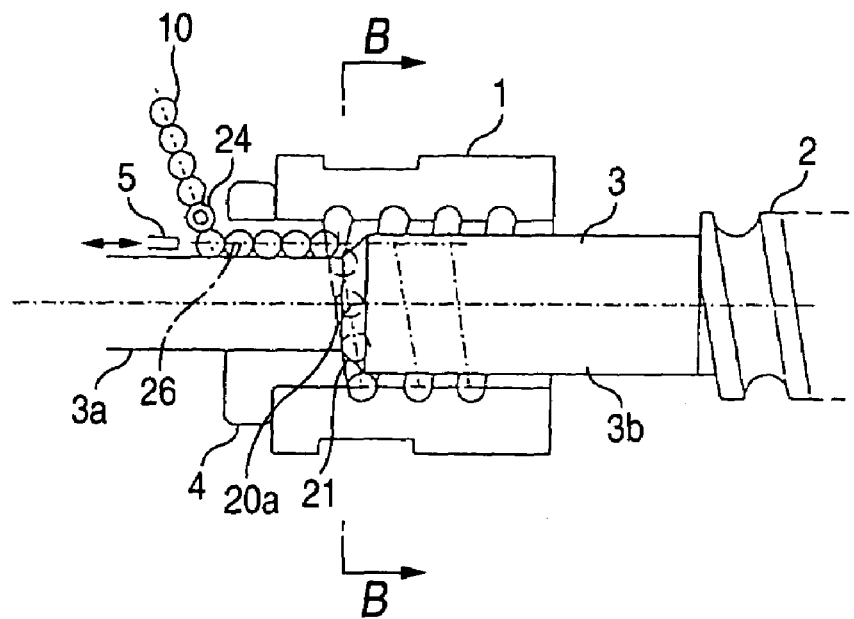
FIG. 13A is an explanatory view of the operation of the apparatus for assembling a ball screw apparatus; in particular, an explanatory section view of a nut and a ball insertion jig, when they are viewed from the lateral side thereof; and, FIG. 13B is a section view taken along the line B—B shown in FIG. 13A.
Figure 13B:
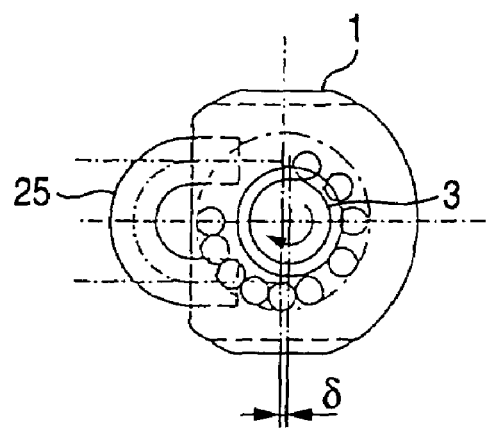
Figure 14:
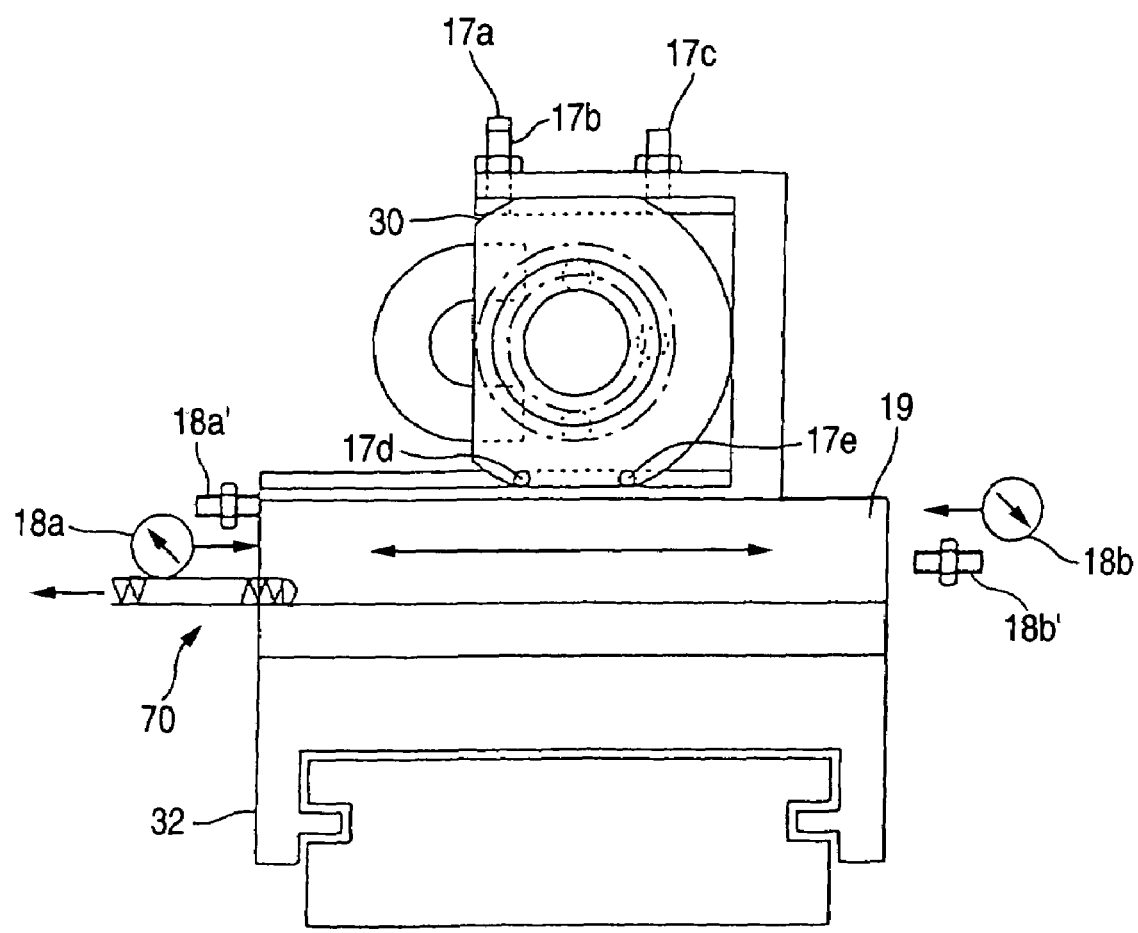
FIG. 14 is an explanatory view of a floating mechanism.

Here, FIG. 8 is an explanatory plan view of an apparatus for assembling a ball screw apparatus according to an embodiment of the invention; FIG. 9 is a front view of FIG. 8; FIG. 10A is an explanatory view of a ball insertion jig; FIG. 10B is a view of the ball insertion jig, when it is viewed from the right side of FIG. 10A; FIG. 10C is a view of the ball insertion jig, when it is viewed from the upper side of FIG. 10A; FIG. 11 is an explanatory section view of the main portions of the above apparatus for assembling a ball screw apparatus, when a nut and a ball insertion jig are viewed from the lateral side thereof; FIG. 12A is an explanatory section view of the nut and ball insertion jig, when they are viewed from above; FIG. 12B is a section view taken along the A—A shown in FIG. 12A; FIG. 13A is an explanatory view of the operation of the apparatus for assembling a ball screw apparatus, when the nut and ball insertion jig are viewed from the lateral side thereof; FIG. 13B is a section view taken along the line B—B shown in FIG. 13A; FIG. 14 is an explanatory view of a floating mechanism; and, FIG. 15 is an explanatory view of another embodiment of an apparatus for assembling a ball screw apparatus according to the invention.

The present apparatus for assembling a ball screw apparatus, as shown in FIGS. 8 and 9, comprises: a provisional shaft 103, with which a nut 101 of the ball screw apparatus with a circulating tube (circulating part) 125 previously assembled thereto can be loosely fitted; a floating mechanism 170 for clamping and holding the nut 101; a provisional shaft support part 109 for supporting the provisional shaft 103 in such a manner that the left end side of the provisional shaft 103 can be rotated; a ball insertion jig 104 fitted into between the provisional shaft 103 and nut 101 from the left end side of the nut 101; a ball distribute and supply feeder (not shown) for distributing a given number of balls from a ball storage portion and supplying the balls into the ball insertion jig 104 through a ball chute 110; a screw shaft right end support part 108 for supporting the right end portion of a screw shaft 102 of the ball screw apparatus engaged with the right end side of the provisional shaft 103 in such a manner that the screw shaft right end portion can be rotated; and, a drive motor (drive device) 111 connected through a coupling 134 to the left end portion of the provisional shaft 103 to apply a rotational force to the provisional shaft 103 and screw shaft 102.

The provisional shaft 109, floating mechanism 170 and screw shaft right end support part 108 are respectively mounted on their associated sliders 132 of a linear guide apparatus and are also supported in such a manner that they can be moved in the axial direction and can be positioned. By the way, of course, instead of the linear guide apparatus, there can also be used a dovetail groove or a V clamp.

Also, on one side of the ball chute 110, there is used a transparent member (not shown) such as an acryl plate, thereby being able to confirm whether a given number of balls are supplied by the ball distributive take-out operation or not and also whether any trouble is occurred or not when the balls are introduced, for example, the balls are caught by something or not.

The provisional shaft 103, as shown in FIG. 11, includes a small-diameter shaft portion 103a on the left end side thereof and a large-diameter shaft portion 103b on the right end side thereof, and includes further a tapered step portion 121 formed between these two shaft portions. The large-diameter shaft portion 103b is formed in a cylindrical shape, while a screw shaft 102 is inserted into the interior of the large-diameter shaft portion 103b from the right end side opening thereof; and, the screw shaft 102 is center supported by a provisional shaft center support member 107 disposed in the interior of the large-diameter shaft portion 103b. Also, the large-diameter shaft portion 3b has a diameter which allows the balls to be held on the BCD (ball center diameter) of the screw groove 122 of the nut 101.

The ball insertion jig 104, as shown in FIGS. 10 and 11, is formed in a cylindrical shape and is fitted into between the provisional shaft 103 and nut 101 from the small-diameter shaft portion 103a side of the provisional shaft 103. In the ball insertion jig 104, there is formed a ball passage 126 which penetrates through the ball insertion jig 104 in the axial direction thereof; and, a given number of balls can be inserted into the ball passage 126 from the ball chute 110.

And, in case where the provisional shaft 103 and screw shaft 102 are rotated (clockwise when viewed from the left end side; see FIG. 13B) by the drive motor 111, the balls inserted into the ball passage 126 are introduced through a guide portion 120a formed between the guide surface 120 of the ball insertion jig 104 and the tapered step portion 121 of the provisional shaft 103 into between the screw groove 122 of the nut 101 and provisional shaft 103 as well as into the circulating tube 125.

Here, the ball exit portion 123 of the ball passage 126 is situated on the upper side in the peripheral direction of the screw groove 122 so that the balls are allowed to flow easily through the guide portion 120 due to their own weights down to the screw groove 122 of the nut 101.

The guide surface 120 of the ball insertion jig 104 is inclined so that the balls can be introduced to the screw groove 122 of the nut 101; and thus, due to this, the balls inserted into the ball passage 126 are allowed to flow into the screw groove 122 of the nut 101 while they roll down along the guide surface 120 and are restricted by the tapered step portion 121 of the provisional shaft 103.

On the ball exit opening 123 of the ball insertion jig 104, as shown in FIGS. 10 and 12, there is disposed a ball stopper 127 which separates the exit side of the circulating tube 125 and guide portion 120a from each other. The ball stopper 127 stops the preceding balls previously introduced in the ball introduction operation in the exit portion of the circulating tube 125 to thereby prevent the preceding balls and the balls to be introduced from the ball exit opening 123 from interfering with each other.

Also, on the leading end portion of the ball stopper 127, there is disposed a projection 128. The projection 128 changes the advancing direction of the balls flowing from the ball passage 126 to thereby guide the balls along the guide portion 120a while preventing the balls from touching directly the groove shoulder of the screw groove 122 of the nut 101. Of course, the ball contact portion of the projection 128 may also be in a cylindrical shape.

By the way, as means for facilitating the introduction of the balls, for example, an air jet-out opening (not shown) may be formed in the leading end portion of the ball stopper 127. In this case, after the balls are pushed out from the ball exit portion 123, the balls are easy to flow into the screw groove 122 along the guide portion 120 by the air.

Also, there may also be provided a ball damper pin (not shown) in the intermediate portion of the ball chute 110 so as to dampen the speeds of the balls. In this case, it is possible to prevent a large number of balls from being inserted at the same time, which dampens impacts to be applied to the ball insertion jig 104, the groove shoulder of the screw groove 122 and balls themselves by the drop of the balls due to their own weights to thereby be able to prevent them against damage.

To clamp the nut 101 by the floating mechanism 170, as shown in FIG. 14, for example, there are used ball plungers 117a~117e. That is, the ball plunger 117a pushes down the upper end arc portion 130 of the nut 101 obliquely downwardly, so that the nut 101 can be held easily. Of course, to hold the nut 101, there may also be used a clamp mechanism such as the air.

Also, the floating mechanism 170, using a micrometer 118a, is capable of fine-adjust the eccentric amount of the nut 101 with respect to the provisional shaft 103. For example, using a single shaft slide unit 109, as shown in FIG. 13, the center of the nut 101 is pulled to the left by a spring (not shown) with respect to the center of the provisional shaft 103 to shift the axis of the nut with respect to the provisional shaft 103, thereby narrowing a groove clearance between the nut 101 and the right side of the provisional shaft 103. At the then time, since the provisional shaft 103 is rotating clockwise, the balls introduced from the ball insertion jig 104 are forcibly pushed into the screw groove 122.

Also, there is employed a structure in which, in case where a groove clearance on the ball rising side is widened, the balls can be pushed up successively while the balls can be prevented from moving too early. Thanks to this structure, there can also be expected an effect that the balls in the circulating tube 125 as well can be pushed up successively.

That is, by shifting the nut 101 and provisional shaft 103 with respect to each other, while moving up the balls successively, not only the too early movements of the balls can be prevented but also the successive insertion of the balls can be attained. By the way, in case where the clearance is widened too much, there is a possibility that the balls can bite into something or can poke out of the circulation passage; and, therefore, on the opposite side of the micrometer 118a as well, there may be installed a micrometer 118b in order to be able to adjust the eccentric amount of the nut 101. Of course, the single shaft slide unit 119, alternatively, may also be composed of a linear guide apparatus or the like. Also, preferably, the heads of the two micrometers 118a, 118b respectively may have rotation preventive mechanisms in their associated thimble portions. By the way, in FIG. 14, reference character 118a' designates a stopper on the micrometer 118a side, while 118b' stands for a stopper on the micrometer 118b side.

Referring now to the screw shaft right end support part 108, a left-going force is applied to it by a compression spring (moving device) 115. This left-going force makes it possible to hold the screw shaft 102 between the screw shaft right end support part 108 and the provisional shaft center support member 107 disposed in the large-diameter shaft portion 103b of the provisional shaft 103.

And, in the provisional shaft support part 109, there is disposed a member for positioning such as an air cylinder 112. To adjust the moving range of the air cylinder 112, there are used a micrometer 113 and a stopper 114. This makes it possible to fine-tune the positioning of the tapered step portion 121 of the provisional shaft 103 with respect to the guide surface 120 of the ball insertion jig 104. A left-going force applied to the provisional shaft support part 109 at the then time is composed of a spring force given by a compression spring 115 disposed on the screw shaft right end support part 108, whereas a right-going force is composed of the air pressure of the air cylinder 112.

On the left end side of the passage portion where the ball chute 110 and ball insertion jig 104 are contacted with each other, there is disposed a ball push-out rod 105 which is supported on a push-out rod support base 106. On the push-out rod support base 106, there is mounted a drive cylinder serving as a drive source which is used to drive the ball push-out rod 105 to advance and retreat. When a ball confirming sensor 124 disposed on the ball chute 110 confirms that the balls are not present, the ball push-out rod 105 is advanced to thereby push out all of the balls existing within the ball passage 126 of the ball insertion jig 104 and, using a sensor disposed on the drive cylinder of the push-out rod support base 106, it is detected that the balls existing within the ball passage 126 are all pushed out therefrom.

The ball push-out rod 105 is caused to stop in a state where it pushes out the balls existing in the ball passage 126 of the ball insertion jig 104.

The reason for this is as follows. That is, to push up all of the balls not introduced into the screw groove 122 of the nut 101 but left in the guide portion 120a between the guide surface 120 and the tapered step portion 121 of the provisional shaft 103 into the screw groove 122 of the nut 101 and to store them in the screw groove 122, the air cylinder 112 is retreated and the provisional shaft 103 is moved to the small-diameter shaft portion 103a, for example, by an amount corresponding to a half pitch using the spring force of the compression spring 115 to thereby allow all of the balls left in the guide portion 120a to climb over the tapered step portion 121; that is, in this operation, in case where the ball push-out rod 105 is caused to stop in a state where it pushes out all of the balls, the ball push-out rod 105 can also be used as a cover which prevents the balls from moving back again to the ball exit portion of the ball passage 126. By the way, in order to prevent the balls against damage, the air pressure maybe used only when returning the ball push-out rod 105, whereas the spring (not shown) may be used when the ball push-out rod 105 pushes out the balls from the ball passage 126 into the screw groove 122.

Also, in order to prevent the tongue portion of the circulating tube 125 and the ball stopper 127 of the ball insertion jig 104 from interfering with each other when allowing the balls left in the guide portion 120a to climb over the tapered step portion 121, the surface of the ball stopper 127 that faces the exit side of the circulating tube 125 is formed as a flat surface 129.

Next, description will be given below of the operation of the above-mentioned apparatus for assembling a ball screw apparatus.

Firstly, to align the nut 101 of the ball screw apparatus (in the present embodiment, there is used a cut formed in the outer surface of the nut), the nut 101 is clamped by the floating mechanism 170 according to a rail guide 131.

Next, a nut positioning air cylinder 133 is projected to slide the floating mechanism 170 to the left, thereby positioning the nut 101 with respect to the ball insertion jig 104. After then, the screw shaft right end hold part 108 is moved to the right against the energizing force of the compression spring 115 to thereby hold the screw shaft 102 in a center support manner between the screw shaft right end hold part 108 and center provisional shaft center support member 107. At the then time, the eccentric amount of the nut 101 with respect to the provisional shaft 103 is adjusted by the micrometers 118a, 118b and stoppers 118a', 118b' of the floating mechanism 170.

Next, a given number of balls supplied from the ball distribution supply feeder are fed through the ball chute 110 into the ball insertion jig 104. The balls fed into the ball insertion jig 104 are allowed to pass through the ball passage 126 of the ball insertion jig 104 and flow from the ball exit portion 123 into the guide portion 120a between the tapered step portion 121 of the provisional shaft 103 and the guide surface 120 of the ball insertion jig 104.

Here, since the provisional shaft 103 is driven and rotated clockwise by the drive motor 111, the balls flowing into the guide portion 120a can be smoothly introduced into the screw groove 122 of the nut 101, while they are falling down due to their own weights along the guide surface 120 of the ball insertion jig 104 under the restriction of the tapered step portion 121 of the provisional shaft 103.

Next, in case where the ball confirming sensor 124 of the ball chute 110 confirms no presence of the balls, the ball push-out rod 105 is advanced to thereby push out all of the balls existing in the ball passage 126 of the ball insertion jig 104; and, using the sensor of the drive cylinder of the push-out rod support base 106, it is detected that the balls existing within the ball passage 126 are all pushed out therefrom. The ball push-out rod 105 stops in the ball push-out completion state and functions as the cover of the ball exit portion 123.

Next, the air cylinder 112 is retreated, the provisional shaft 103 is moved to the small-diameter shaft portion 103a side by an amount corresponding to, for example, a half pitch to thereby allow all of the balls not introduced into the screw groove 122 of the nut 101 but left in the guide portion 120a between the guide surface 120 of the ball insertion jig 104 and the tapered step portion 121 of the provisional shaft 103 to climb over the tapered step portion 121, so that the balls are pushed up into the screw groove 122 of the nut 101 and are held on the provisional shaft 103 and on the BCD of the screw groove 122 of the nut 101.

After then, in case where a nut positioning cylinder 133 is pulled back, due to a tension spring 116 mounted on the floating mechanism 170, the nut 101 is moved from the provisional shaft 103 to the screw shaft fitting position thereof, the provisional shaft 103 and screw shaft 102 are rotated counterclockwise by the drive motor 111 with a slight tensile force given thereto by the tension spring 116 to match the nut 101 and screw shaft 102 to each other in the screw groove phase, thereby being able to start the fit between the nut 101 and screw shaft 103.

By the way, the screw shaft 102 and nut 101 can also be fitted with each other in the following manner: that is, the nut 101 is moved to the fitting position by the tension spring 116 in a state where the nut 101 and screw shaft 102 are matched in phase to each other using a sensor (not shown) or the like and, after then, the screw shaft 101 is rotated counterclockwise by the drive motor 111. Also, in case where the screw shaft 102 and nut 101 are matched to each other in phase using a clutch (not shown) and the fitting between them starts, the nut 101 and screw shaft 102 can be fitted with each other only by a tensile force given by the tension spring 116 while cutting off a rotation force given by the drive motor 111.

In case where the fitting between the nut 101 and screw shaft 102 is completed, the ball screw apparatus is assembled. After then, the screw shaft right end support part 108 and ball screw apparatus are moved together to the right against the energizing force of the compression spring 115 to thereby remove the ball screw apparatus from the assembling apparatus, which completes the assembling operation of the ball screw apparatus.

By the way, the invention is not limited to the above-mentioned embodiment but various proper changes are possible without departing from the gist of the invention.

For example, in the above-illustrated embodiment, as the circulating part, there is used a circulating tube. However, the invention can also be applied to a ball screw apparatus of a circulating piece type in which the phase of a circulating piece varies in every circulating circuit. That is, by clamping the nut, which is fixed in the upward and downward directions, so as to be rotatable, the phase of the ball exit portion 123 can be matched to the highest position of the circulating piece, which makes it possible to assemble the ball screw apparatus of a circulating piece type.

Also, in case where the nut 101, ball insertion jig 104 and ball push-out rod 105 are all structured so as to be rotatable with respect to the provisional shaft 103, when the provisional shaft 103 is shifted to the left side, the balls are allowed to roll down into the screw groove 122 of the nut 101 due to their own weights without pushing up the balls into the screw groove 122 in the tapered step portion 121, which can reduce the loads to be applied to the balls.

Further, in the above-illustrated embodiment, the assembling apparatus is structured in such a manner that a ball screw apparatus is assembled while the provisional shaft 103 is disposed horizontally. However, according to the present assembling apparatus, the ball screw apparatus can also be assembled even in case where the inclination angle of the whole of the assembling apparatus is set freely. For example, in case where the whole of the assembling apparatus is inclined at such an angle as to be able to dispose the ball insertion jig 104 at a position higher than the nut 101 to thereby omit the horizontal portion of the ball insertion portion 126, insertion of the balls due to their own weights is possible and thus the ball push-out rod 105 can be omitted, which makes it possible to reduce the number of parts. In this case, preferably, as a part which can play the role of a cover for the ball exit portion 123 when the provisional shaft 103 is shifted to the left, there may bed is posed a shutter separately.

Further, in the above-illustrated embodiment, to allow all of the balls left in the guide portion 120a to climb over the tapered step portion 121, the provisional shaft 103 is shifted to the left using the repelling force of the compression spring 115. However, according to the assembling method of the invention, instead of this structure, there may also be employed a structure in which a drive unit including the provisional shaft 103 is fixed and the ball insertion jig 104 is moved together with the nut 101 to the screw shaft 102 side by a half pitch.

In this case, the ball push-out rod 105 may be structured such that it can be moved by a half pitch together with the ball insertion jig 104. Since the drive unit including the provisional shaft 103 is fixed, the compression spring 115 need only to support the screw shaft 102, which can simplify the structure of the whole of the assembling apparatus. According to the present method, when there is employed a structure in which the inclination angle of the whole of the above-described assembling apparatus is set freely, in case where these two structures are used in combination, there is eliminated the load to be applied to the compression spring 115, which can reduce the force that is necessary to make the balls climb over the tapered step portion 121.

Further, in the above-illustrated embodiment, the provisional shaft 103 is rotated using the drive motor 111. However, a drive motor may be installed on the right end side of the screw shaft 102 and a rotational force may be applied to the screw shaft 102 from the drive motor; that is, in this case as well, a similar ball introduction operation to the above-illustrated embodiment can be carried out. Also, the rotational force may also be applied not using the center support of the right end portion of the screw shaft 102 but using a rotary chuck.

And, in the above-illustrated embodiment, the assembling operation is executed in a state where the provisional shaft 103 and screw shaft 102 are connected to each other. However, after the provisional shaft 103 is supported or chucked separately, the balls may be introduced into the nut 101 and, after such introduction of the balls, the nut 101 and screw shaft 102 maybe fitted with each other. Also, instead of using the cylinder for positioning the respective support portions, a motor or the like may be used to position the respective support portions a multi-point positioning manner. This can also facilitate the automated execution of the assembling steps.

Figure 15A:
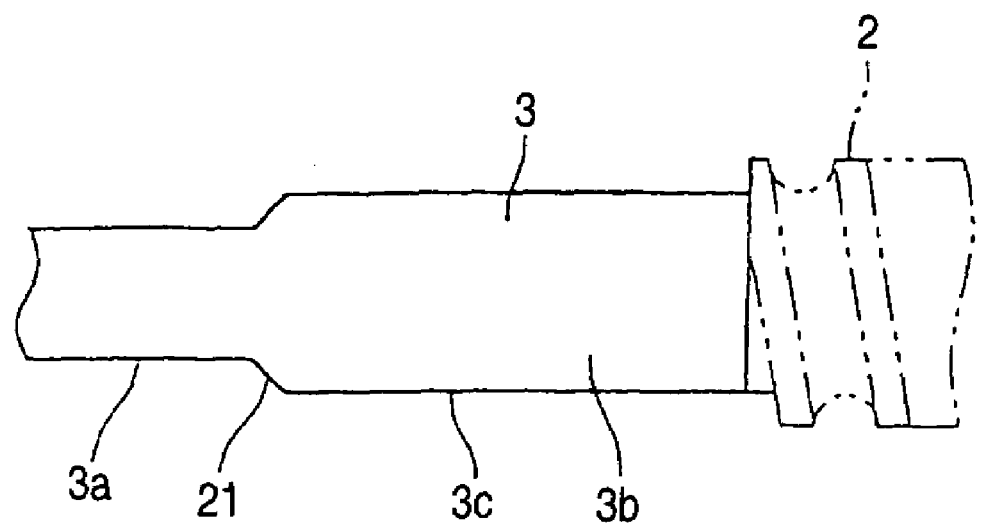
FIG. 15A is a view of a provisional shaft, showing a state in which an elastic member is disposed on the entire outer peripheral surface of the provisional shaft; and, FIG. 15B is a view of the provisional shaft, showing a state in which an elastic member is spirally disposed on the outer peripheral surface of the provisional shaft.

Also, as shown in FIG. 15A, the entire outer peripheral surface of the provisional shaft 103 including the tapered step portion 121 may also be coated with an elastic member 103c, or, as an example of the elastic member 103c, urethane rubber or the like may be shrinkage fitted with or bonded to the entire outer peripheral surface of the provisional surface 103. In this case, when the provisional shaft 103 is rotated to thereby introduce the balls, a frictional force can be applied to the balls and thus the balls can be made difficult to slip. This can enhance the introduction efficiency of the balls to the nut 101 side. By the way, alternatively, an elastic seal member such as an O ring may be buried in the outer peripheral surface of the provisional shaft 103 in the peripheral direction or in the axial direction. In this case as well, there can be obtained a similar operation effect.

Figure 15B:
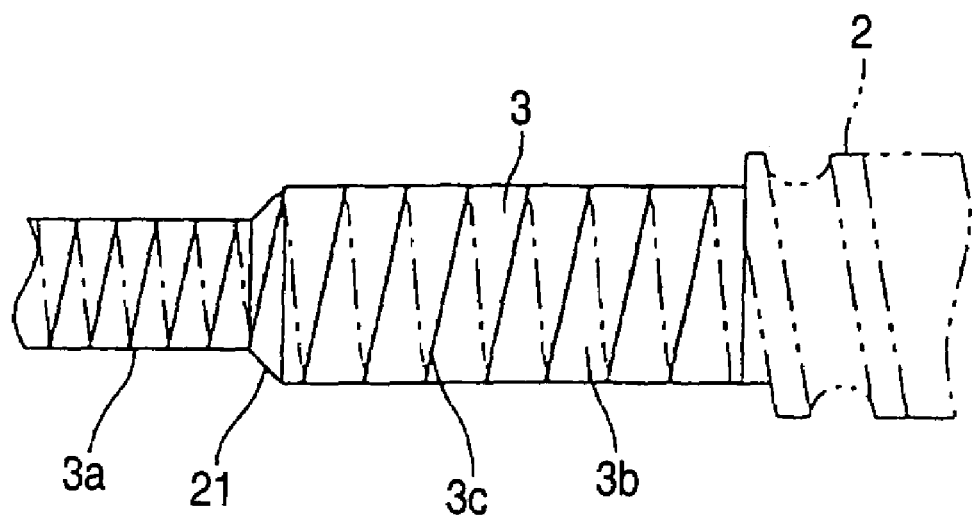
FIG. 15 is an explanatory view of another embodiment of an apparatus for assembling a ball screw apparatus according to the invention; in particular.

Further, as shown in FIG. 15B, an elastic member 103c may also be spirally coated on or buried in the outer peripheral surface of the provisional shaft 103 including the tapered step portion 121. In this case as well, the balls can be introduced into the nut 101 with high efficiency. Of course, the pitch, lead, projection amount, width, winding direction and the like of the elastic member 103c may be set arbitrarily. Also, similarly, the provisional shaft center support member 107 and the provisional shaft center support portion of the screw shaft right end support part 108 may be coated with the elastic member 103c. In this case, mutual slippage between the screw shaft 102 and provisional shaft 103 can be restricted.

As can be seen clearly from the foregoing description, according to a ball given quantity supply apparatus structured in accordance with the invention, a given quantity of balls can be always supplied positively and quickly even when supplying a given quantity of balls which are often covered with oil having a relatively high coefficient of viscosity such as anticorrosive oil for supply to a bearing, a ball screw and a linear guide.

Further, as can be seen clearly from the foregoing description, according to the invention, since a given number of balls can be introduced smoothly into the nut with the circulating part assembled to the nut, the operation efficiency can be enhanced. Also, because the nut is made eccentric to the provisional shaft when the balls are introduced into the nut, the balls can be introduced successively while preventing the balls from moving too early within the circulation passage. Further, in case where the elastic member is applied to, buried in, shrinkage fitted with, or bonded to the outer peripheral surface of the provisional shaft including the above-mentioned tapered step portion, the introduction efficiency of the balls into the nut can be enhanced.

What is claimed is:

1. A ball given quantity supply apparatus, comprising:
    a ball storage portion for storing a plurality of balls therein;
    a ball arranging device for arranging a plurality of balls stored in the ball storage portion in a line;
    a ball delivery device including a ball passage extended from the ball storage portion so as not only to be able to receive a plurality of balls arranged in a line by the ball arranging device when the plurality of balls are supplied thereto but also to allow the plurality of balls supplied thereto to pass in a line therethrough, the ball delivery device being capable of delivering the plurality of balls arranged in a line in the ball passage from the ball storage portion to the extended end portion of the ball passage using gravity;
    a first gate device disposed at a position near to the ball storage portion in the ball passage of the ball delivery device for opening and closing the ball passage;
    a second gate device disposed at a position more distant from the ball storage portion in the ball passage of the ball delivery device than the first gate device for opening and closing the ball passage and also for holding a given quantity of balls between the first gate device and itself;
    a pressurized fluid jetting device disposed in the vicinity of the first gate device in the ball passage of the ball delivery device for jetting out a pressurized fluid onto the balls to thereby separate substances attached to the surfaces of the balls from these surfaces; and
    an operation control device for detecting that a given quantity of balls are held between the first and second gate devices in the ball passage of the ball delivery device, and also for controlling the operations of the first and second gate device, wherein
    the operation control device opens the first gate device and closes the second gate device while the plurality of balls arranged in a line by the ball arranging device are being supplied into the ball passage of the ball delivery device, and closes the first gate device and opens the second gate device after it is detected that a given quantity of balls are held between the first and second gate devices in the ball passage of the ball delivery device.

2. The ball given quantity supply apparatus as set forth in claim 1, wherein
    the ball storage portion includes a ball receiving recessed portion for receiving a plurality of balls therein;
    the ball receiving recessed portion has a structure in which the plurality of balls in the ball receiving recessed portion are arranged along a given area of the inner peripheral surface thereof due to gravity;
    the ball arranging device arranges the plurality of balls along the given area of the inner peripheral surface of the ball receiving recessed portion of the ball storage portion in a line; and
    the ball passage of the ball delivery device is open in the ball receiving recessed portion of the ball storage portion along the given area of the inner peripheral surface of the ball receiving recessed portion of the ball storage portion, and is supplied with the plurality of balls arranged in a line by the ball arranging device through the opening thereof.

3. The ball given quantity supply apparatus as set forth in claim 1, wherein the cross section of the ball passage has a polygonal shape.

4. The ball given quantity supply apparatus as set forth in claim 3, wherein
the pressurized fluid jetting device jets out the pressurized fluid into between the outer peripheral surfaces of the balls passing through the ball passage and at least one of a plurality of corners of the polygonal shape of the cross section in the cross section of the ball passage.

5. The ball given quantity supply apparatus as set forth in claim 1, further comprising:
a pressurized fluid discharge device disposed in the vicinity of the first gate device and at a position nearer to the extended end portion than the second gate device in the ball passage of the ball delivery device for discharging the pressurized fluid jetted from the pressurized fluid jetting device into the ball passage to the outside of the ball passage.

6. The ball given quantity supply apparatus as set forth in claim 1, wherein the pressurized fluid jetting device jets out the pressurized fluid intermittently.

7. The ball given quantity supply apparatus as set forth in claim 1, wherein
the operation control device includes:
a first ball detector disposed in the ball passage of the ball delivery device so as to adjoin the downstream side of the first gate device, and
a second ball detector disposed in the ball passage of the ball delivery device so as to adjoin the upstream side of the second gate device.

8. The ball given quantity supply apparatus as set forth in claim 1, wherein
the ball arranging device includes:
a ball forced supply device for supplying forcibly the plurality of balls arranged in a line by the ball arranging device to the ball passage of the ball delivery device.

9. The ball given quantity supply apparatus as set forth in claim 1, further comprising:
a ball passage number count device disposed on the downstream side of the second gate device in the ball passage of the ball delivery device for counting the number of balls having passed through the ball passage.

10. The ball given quantity supply apparatus as set forth in claim 9, wherein
the ball passage number count device includes an optical sensor, and
the pressurized fluid is jetted onto the optical sensor.

11. The ball given quantity supply apparatus as set forth in claim 1, further comprising:
a hand-operated ball supply device disposed in the ball passage of the ball delivery device so as to communicate with the downstream side of the second gate device.

12. The ball given quantity supply apparatus as set forth in claim 11, wherein
the hand-operated ball supply device includes:
a funnel-shaped ball throw member,
a ball guide member extended from the central portion of the bottom surface of the ball throw member to the downstream side of the second gate device in the ball passage of the ball delivery device so as to communicate with the present downstream side, and
a ball mixing device for mixing a plurality of balls thrown into the ball throw member to thereby prevent the plurality of balls from being clogged in the entrance of the ball guide member.

13. The ball given quantity supply apparatus as set forth in claim 11, further comprising:
a ball passage number count device disposed downstream of the communicating portion of the hand-operated ball supply device in the ball passage of the ball delivery device for counting the number of balls having passed through the ball passage.

14. The ball given quantity supply apparatus as set forth in claim 13, wherein
the ball passage number count device includes an optical sensor, and
the pressurized fluid is jetted onto the optical sensor.

* * * * *